(12) United States Patent
Tahara

(10) Patent No.: US 7,560,179 B2
(45) Date of Patent: Jul. 14, 2009

(54) FUEL CELL APPARATUS AND METHOD FOR CONTROLLING FUEL

(75) Inventor: Masahiko Tahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 10/478,393

(22) PCT Filed: Mar. 20, 2003

(86) PCT No.: PCT/JP03/03435

§ 371 (c)(1),
(2), (4) Date: Dec. 23, 2003

(87) PCT Pub. No.: WO03/079479

PCT Pub. Date: Sep. 25, 2003

(65) Prior Publication Data

US 2004/0175602 A1 Sep. 9, 2004

(30) Foreign Application Priority Data

Mar. 20, 2002 (JP) ............... 2002-077658
Mar. 20, 2002 (JP) ............... 2002-077719
Feb. 28, 2003 (JP) ............... 2003-053612

(51) Int. Cl.
*H01M 8/00* (2006.01)
(52) U.S. Cl. ............... 429/12; 429/13; 320/137; 323/299
(58) Field of Classification Search ............... 429/12, 429/13; 323/299; 320/137
See application file for complete search history.

(56) References Cited

U.S. PATENT DOCUMENTS

| 5,714,874 | A | * | 2/1998 | Bonnefoy | 323/299 |
| 2002/0102444 | A1 | * | 8/2002 | Jones et al. | 429/13 |
| 2002/0106537 | A1 | * | 8/2002 | Saito | 429/13 |
| 2004/0033395 | A1 | * | 2/2004 | Thompson | 429/13 |

FOREIGN PATENT DOCUMENTS

| DE | 10007973 A1 | 9/2000 |
| DE | 10057804 A1 | 8/2001 |
| JP | 7-272736 A | 10/1995 |
| JP | 11-162490 A | 6/1999 |
| JP | 2000-243418 A | 9/2000 |
| JP | 2001-155752 A | 6/2001 |
| JP | 2001-256988 | 9/2001 |
| JP | 2001-256988 A | 9/2001 |
| JP | 2001-319673 | 11/2001 |
| JP | 2001-319673 A | 11/2001 |
| JP | 2002-141085 A | 5/2002 |
| JP | 2003-173805 A | 6/2003 |
| WO | 00/02283 | 1/2000 |

OTHER PUBLICATIONS

Office Action issued by the Japanese Patent Office on Feb. 6, 2007 for corresponding Japanese Application No. 2003-053612.

* cited by examiner

*Primary Examiner*—Jane Rhee
(74) *Attorney, Agent, or Firm*—Bell, Boyd & Lloyd LLP

(57) ABSTRACT

The present invention relates to a fuel cell. The fuel cell includes an electricity generator which has an oxygen electrode, a fuel electrode, and a solid polymer type electrolyte membrane disposed between the oxygen electrode and the fuel electrode, and a method for controlling the fuel cell.

5 Claims, 12 Drawing Sheets

FUEL CELL APPARATUS AND METHOD FOR CONTROLLING FUEL

CROSS REFERENCES TO RELATED APPLICATIONS

The present application claims priority to Japanese Patent Document Nos. P2002-077658 filed on Mar. 20, 2002; P2002-077719 filed on Mar. 20, 2002; and P2003-053612 filed on Feb. 28, 2003, the disclosures of which are herein incorporated by reference.

BACKGROUND OF THE INVENTION

The present invention relates to fuel cells. More specifically, the present invention relates to a fuel cell apparatus having an electrolyte disposed between a fuel electrode and an oxygen electrode, wherein a fuel, such as hydrogen, as well as air are fed to the fuel cell to generate desired electromotive force, and a method for controlling the fuel cell.

In general a fuel cell is an apparatus in which an electricity generator generates electric power by supplying fuel fluid, such as hydrogen gas or methanol, and a solid polymer type fuel cell generally has a structure such that a proton conductor membrane is disposed between an oxygen-side electrode and a fuel-side electrode. Air is fed to the oxygen-side electrode for supplying oxygen thereto, and fuel fluid is supplied to the fuel-side electrode. When the fuel cell generates electricity, protons move an electrolyte membrane which is an ion-exchange membrane, and reacts with oxygen on the oxygen-side electrode to cause a current and form water on the oxygen-side electrode. The electricity generator portion of the fuel cell is called electrolyte membrane-electrode composite or membrane and electrode assembly (MEA), and a fuel cell having a plane structure is constituted by the electrolyte membrane-electrode composite solely or the composites arranged in a plane, or a fuel cell having a stack structure is constituted by the composites stacked on one another.

Recently, in the field of vehicles for transport and the like, application of the fuel cell to electric car or hybrid car is intensively expected, and, in addition, the fuel cell is expected to be put into practical use as a household power supply system and the like. Further, taking advantage of the lightweight and small fuel cell, studies and development are being made on application of the fuel cell to portable apparatus, small-size power supply, and the like.

As a fuel cell of one type, there is a fuel cell having no moistening device for keeping humidity of the electrolyte membrane or the like (hereinafter, the fuel cell of this type is referred to as "self-moistening type fuel cell"). The self-moistening type fuel cell is constructed so that moisture formed on the oxygen-side electrode causes the electrolyte membrane to be wet to promote ion-exchange. In the fuel cell, control of evaporation of the moisture formed leads to control of the electricity generation performance of the fuel cell, and the output voltage directly affects heat generation and the output current directly affects water formed. Therefore, it is necessary to operate the self-moistening type fuel cell so that the electrolyte membrane is appropriately wet by utilizing formed water, which is directly affected by the output current, and excess water formed would not block the feed passage of oxygen.

However, especially in the above-mentioned self-moistening type fuel cell, when the load current is decreased or the air feed rate is increased during the operation, the electrolyte membrane is reduced in moisture and dried. In the fuel cell dried, the ion-exchange characteristics of the electrolyte membrane become poor, so that the output of the fuel cell is considerably lowered. In addition, not only when the load current is decreased during the operation, but also, for example, when the fuel cell is started again after the fuel cell is allowed to stand for a long time, the electrolyte membrane is in a dry state, and it is not easy to let the electrolyte membrane be wet again after the start, and hence it takes a period of time as long as several days to recover the original performance of the fuel cell to obtain a desired rated output. The problem of drying of the electrolyte membrane is marked especially in an open-air type fuel cell in which no compressed air feeding is conducted, and the problem of drying arises merely if the fuel cell is allowed to stand after the operation, causing a disadvantage in that the output characteristics are lowered in a short time.

A need therefore exists to provide improved fuel cells and methods of producing and using same.

SUMMARY OF THE INVENTION

The present invention provides a fuel cell apparatus and a method for controlling a fuel cell, which can prevent the problems of the low output during the operation or at the start of operation.

The fuel cell apparatus of the present invention, in an embodiment, has a fuel cell having an electricity generator which includes an oxygen electrode, a fuel electrode, and an electrolyte disposed between the oxygen electrode and the fuel electrode, wherein the fuel cell apparatus has a bypass circuit for electrically connecting the oxygen electrode and the fuel electrode to allow a current flow if an output voltage of the fuel cell becomes equal to a first predetermined value or less.

Fuel cells are known to be problematic in that the electrolyte membrane is dried to lower the ion-exchange characteristics when lowering the load current or increasing the air feed rate during the operation or when allowing the fuel cell to stand for a long time, so that the output of the fuel cell is considerably lowered. In the present invention, a load control portion for permitting a load on the fuel cell to vary depending on the output state of the fuel cell or an air feeding control portion is provided in the fuel cell and controlled to increase the load current or suppress the air feeding when the output characteristics are lowered, the internal resistance value is increased, and/or the like thus solving the above problem.

In an embodiment of the present invention, the bypass circuit is provided and therefore, if, for example, the output characteristics decreases due to drying of the oxygen electrode, the bypass circuit is operated and controlled to permit a load current on the fuel cell to vary depending on the output state, making it possible to intentionally increase the amount of water formed. The formed water can suppress drying of the oxygen electrode and also let the oxygen electrode be in an appropriate wet state. In one embodiment of the present invention, the first predetermined value is in the range of, for example, about 0.01 V to about 0.8 V per electricity generator, and set to be, for example, about 1% to about 95% of a usual electromotive force. Alternatively, the first predetermined value may be set to be a value by the amount lowered from the electromotive force that is typically or generally produced during operations.

In an embodiment, a fuel cell apparatus of the present invention includes a fuel cell including an electrolyte disposed between a fuel electrode and an oxygen electrode, wherein the fuel cell generates electromotive force by feeding a fuel to the fuel electrode and feeding air to the oxygen electrode; and a load control portion, connected to the fuel cell, for permitting a load on the fuel cell to vary depending on the state of output or internal resistance of the fuel cell.

In the fuel cell according to an embodiment, air is fed to the oxygen electrode while feeding a fuel to the fuel electrode to cause proton conduction in the electrolyte. The amount of the proton conduction varies in accordance with the load current connected to the fuel cell, and, if the load current value is smaller, the output voltage increases to reduce heat generation and, conversely, if the load current is larger, the amount of the proton conduction increases and an amount of formed water increases. The reason for this is that the reaction on the oxygen electrode is promoted. For example, if the output characteristics are lowered due to drying of the oxygen electrode, the load control portion is operated and controlled to permit a load current on the fuel cell to vary depending on the output state, making it possible to intentionally increase the amount of water formed. The water formed can suppress drying of the oxygen electrode as well as let the oxygen electrode be in an appropriate wet state.

Further, a method for controlling a fuel cell according to an embodiment of the present invention includes monitoring output characteristics or internal resistance characteristics of a fuel cell; and controlling a current flowing the fuel cell to be larger than usual if the output characteristics or internal resistance characteristics of the fuel cell change.

In the method for controlling a fuel cell of the present invention in an embodiment, first, the output characteristics or internal resistance characteristics of the fuel cell are monitored to judge whether or not the output characteristics or internal resistance characteristics of the fuel cell change. If the output characteristics or internal resistance characteristics of the fuel cell change, for example, the output characteristics decreases due to drying of the oxygen electrode, the current which flows the fuel cell is controlled to be larger than usual so as to promote the reaction on the oxygen electrode, so that the amount of water formed is increased. Thus, not only can drying of the oxygen electrode be suppressed, but also the oxygen electrode can be in an appropriate wet state.

A fuel cell apparatus of the present invention in an embodiment includes a fuel cell comprising an electrolyte disposed between a fuel electrode and an oxygen electrode, wherein the fuel cell generates electromotive force by feeding a fuel to the fuel electrode and feeding air to the oxygen electrode; and an air feeding control portion for permitting a feed rate of air fed to the oxygen electrode of the fuel cell to vary depending on the state of the output, internal resistance and/or the like of the fuel cell.

In the fuel cell, air is fed to the oxygen electrode while feeding a fuel to the fuel electrode to cause proton conduction in the electrolyte. The amount of the proton conduction varies depending on the load current connected to the fuel cell, and, if the load current becomes larger, the amount of the proton conduction increases and an increased amount of water is formed. The feed rate of air fed to the oxygen electrode of the fuel cell is ideally operated so that, for example, during the operation, the amount of water formed and the amount of moisture evaporated which depends on the air feed rate are steadily in equilibrium, but the air feed rate is changed by the air feeding control portion and controlled so as to, for example, suppress evaporation of moisture from the fuel cell surface, thus making it possible to suppress drying of the oxygen electrode and let the oxygen electrode be in an appropriate wet state.

Further, a method for controlling a fuel cell of the present invention in an embodiment includes monitoring output characteristics or internal resistance characteristics of a fuel cell; and controlling a feed rate of air fed to the fuel cell to be smaller than usual if the output characteristics or internal resistance characteristics of the fuel cell change.

If the output characteristics or internal resistance characteristics of the fuel cell change, the feed rate of air fed to the fuel cell is controlled to be smaller than usual (i.e., under usual, normal and/or standard operating conditions), and thus, not only can drying of the oxygen electrode in the fuel cell be suppressed, but also the oxygen electrode can be in an appropriate wet state, and monitoring the necessity of this directly from the output characteristics or internal resistance characteristics of the fuel cell makes it possible to quickly deal with the matter even if a failure occurs in the electricity generation. In the present specification, the measurement of electromotive force encompasses measurements and calculations of an output current and an internal resistance of the fuel cell or similar parameters.

Additional features and advantages of the present invention are described in, and will be apparent from, the following Detailed Description of the Invention and the figures.

DETAILED DESCRIPTION OF THE INVENTION

The present invention relates to fuel cells. More specifically, the present invention relates to a fuel cell apparatus having an electrolyte disposed between a fuel electrode and an oxygen electrode, wherein a fuel, such as hydrogen, as well as air are fed to the fuel cell, to generate the desired electromotive fuel and method for controlling the fuel cell.

Figure 1:
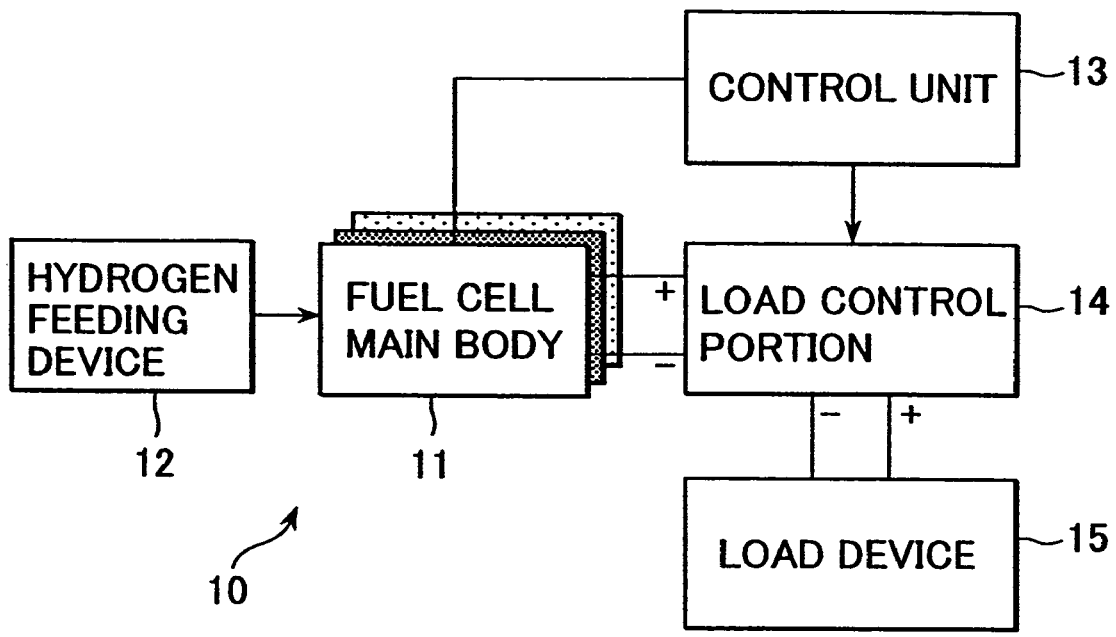
FIG. 1 is a block diagram showing a fuel cell apparatus according to an embodiment of the present invention.

A preferred embodiment of a fuel cell apparatus of the present invention will be described with reference to the drawings. FIG. 1 is a block diagram showing a fuel cell apparatus according to the present embodiment. A fuel cell apparatus 10 of the present embodiment in an embodiment has a fuel cell main body 11 for generating electromotive force, a control unit 13 for controlling a load, and a load control portion 14, connected to the fuel cell main body 11, for permitting a value of a load on the fuel cell main body 11 to vary. Electromotive force is generally supplied to a load device 15 through the load control portion 14, and a hydrogen feeding device 12 for feeding fuel fluid is connected to the fuel cell main body 11.

The fuel cell main body 11 has a structure described below as an example such that an electrolyte membrane in a substantially flat plate form is disposed between a fuel-side electrode (fuel electrode) and an oxygen-side electrode (oxygen electrode), and fuel fluid, such as hydrogen gas or methanol, is fed to the fuel-side electrode from the hydrogen feeding device 12 having a hydrogen storage function. The oxygen-side electrode is an electrode for drawing oxygen contained in air, and it faces the fuel-side electrode through the electrolyte membrane. The oxygen-side electrode may be of an open-air type, and may have a structure to which air is fed by means of a compressor, a pump, or a fan. The fuel cell main body 11 may be either in a stack laminate form obtained by stacking on one another a plurality of structures, each of which includes the electrolyte membrane in a substantially flat plate form disposed between the fuel-side electrode and the oxygen-side electrode, or in a flat plate form consisting of one structure or two structures stacked.

The hydrogen-feeding device 12 is a device for feeding fuel fluid, such as hydrogen gas or methanol, to the fuel cell main body 11 and, as an example, a hydrogen high-pressure tank or a cartridge containing an alloy having hydrogen absorbed therein may be used. The hydrogen feeding device 12 may be detachable from the fuel cell main body 11 as mentioned below, and may be of a structure such that transmission and reception of information about the fuel conditions are conducted at a joint portion.

The control unit 13 is a controller for controlling the fuel cell apparatus 10, and it monitors the state of the output or internal resistance of the fuel cell in the fuel cell main body 11 and outputs signals for controlling in accordance with the state of the output or internal resistance to the load control portion 14. The control unit 13 includes of desired electronic circuits, CPU (central processing unit), and the like. The control unit 13 and the fuel cell main body 11 do not necessarily have to be unified, but may be individually fitted, or part of the data processing unit of an electronic appliance having the fuel cell main body 11 mounted may be utilized. In the present embodiment, the control unit 13 monitors the output voltage or internal resistance value of the fuel cell. However, the monitoring is not limited to this, and the output current may be monitored or the conditions including a temperature, a humidity, and an atmospheric pressure may also be monitored simultaneously.

The load control portion 14 is a bypass circuit for permitting a load on the fuel cell main body 11 to vary depending on the state of the output or internal resistance of the fuel cell main body 11, and, in order to let the fuel cell main body 11 be in an overcurrent state, a switch element may be disposed between the output terminals of the fuel cell main body 11 to cause short-circuiting so that the switch element is in an ON-state. Alternatively, in order to let the fuel cell main body 11 be in an overcurrent state, the output terminals of the fuel cell main body 11 may be connected by a low-resistance element. The load control portion 14 may be of a structure such that a primary current of a DC-DC converter or the like is in an overcurrent state as mentioned below. When the fuel cell main body 11 is in an overcurrent state, the output voltage of the fuel cell main body 11 rapidly lowers. Therefore, as a compensating means for making up for the lowered output voltage, e.g., a floating battery or a capacitor may be provided in the subsequent load device 15.

The load device 15 is a device to which the electromotive force generated in the fuel cell apparatus 10 is fed, and, when an apparatus onto which the fuel cell apparatus 10 is mounted is, for example, a personal computer, the fuel cell apparatus 10 is used as a power supply for the personal computer, and therefore the load device 15 corresponds to an internal circuit or a peripheral device. On the other hand, when the fuel cell apparatus 10 is mounted on a transport machine, such as an automobile, the load device corresponds to a device for causing thrust force, such as a motor. Further, if the fuel cell apparatus 10 is used as a household small-size power supply, an electric bulb or a household electric appliance corresponds to the load device.

Figure 2:
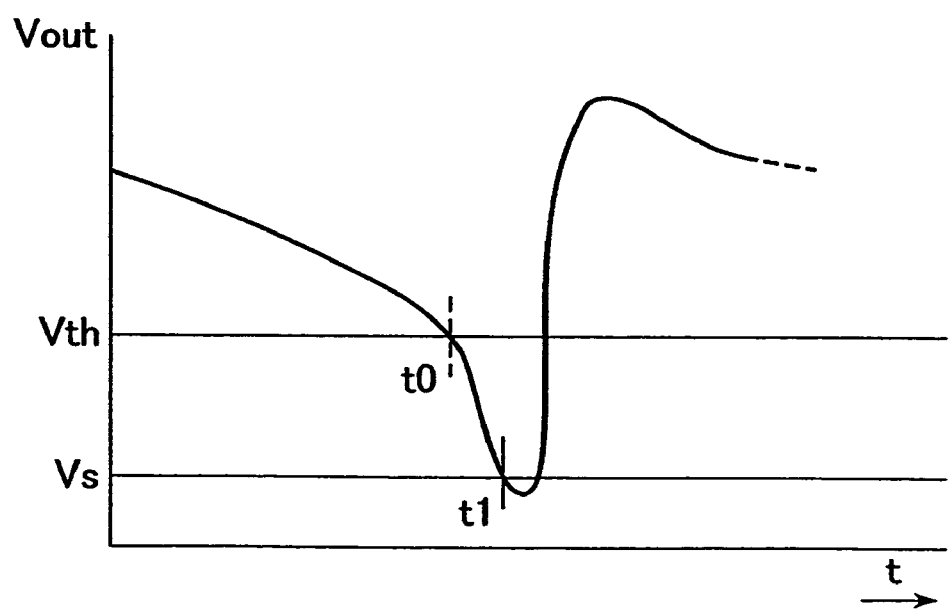
FIG. 2 is a time chart showing the output voltage of a fuel cell apparatus according to an embodiment of the present invention.

Next, one example of the operation of the load control portion 14 will be described with reference to FIG. 2. In FIG. 2, an output voltage Vout of the fuel cell main body, in which the air feed rate and the load current are constant, is taken as the ordinate, and a time t is taken as the abscissa. In the fuel cell apparatus 10 of FIG. 1, the voltage Vout is maintained at a relatively large value at first, but, as the operation continues, drying of the electrode on the surface of the fuel cell main body 11 may be promoted due to the operation environment. As a result, the output voltage Vout of the fuel cell main body 11 gradually decreases and becomes lower than a threshold voltage Vth at a point in time $t_0$. The threshold voltage Vth is a reference level indicating that the output of the fuel cell in the fuel cell main body 11 becomes low. If it is recognized that the output voltage Vout of the fuel cell main body 11 is lower than the threshold voltage Vth on the control unit 13 side, the control unit 13 detects that the output of the fuel cell in the fuel cell main body 11 is low, and an operation for recovery of the function is performed. Specifically, a signal is transmitted from the control unit 13 to the load control portion 14 to, for example, let the load control portion 14 be in a low-resistance state.

By letting the load control portion 14 be in a low-resistance state, an overcurrent flows the fuel cell main body 11, so that the dried surface of the fuel cell main body 11 can be in a wet state in a short time. When an overcurrent flows, the load electric power of the output means is smaller as viewed from the fuel cell side and therefore the output voltage becomes small, but a large amount of a current flows in turn, and thus drawing of oxygen atoms by ion-exchange is activated to cause moisture in a large amount to form. For this reason, the surface of the fuel cell main body 11 can be in a wet state in an extremely short time. While the load control portion 14 is in a low-resistance state as mentioned above, electric power supply to the subsequent load device 15 is unsatisfactory as it is. However, temporary use of an electric power compensating means, such as a floating battery or a capacitor, provided in the load control portion 14 can prevent the load device 15 from suffering interruption of the electric power supply.

When the load control portion 14 is in a low-resistance state, the output voltage Vout of the fuel cell main body 11 rapidly decreases, and the output voltage Vout becomes lower than a voltage Vs at a point in time $t_1$ in FIG. 2, so that the lowering of the output voltage Vout to this point is detected by the control unit 13 side. As a result, the control unit 13 transmits signals for terminating the operation for recovery of the function of the fuel cell to the load control portion 14. According to the signals, the load control portion 14 changes the circuit state from the low-resistance state to a general state.

As a parameter for detecting the dry state of the fuel cell main body 11, instead of the above-mentioned output voltage Vout of the fuel cell main body when the air feed rate and the load current are constant, an internal resistance value r may be used in accordance with, for example, a current interrupt method. In this case, if the internal resistance value r exceeds a certain value, similar control to the one described above causes an overcurrent to flow the fuel cell main body 11, enabling the dried surface of the fuel cell main body 11 to be in a wet state in a short time. In this case, the control unit 13 corresponds to an output characteristics or internal resistance characteristics monitoring means for monitoring the output characteristics or internal resistance characteristics of the fuel cell.

Thus, in the fuel cell apparatus 10 of the present embodiment, the control is made in such a way that the fuel cell main body 11 becomes in an overcurrent state if the output voltage Vout from the fuel cell main body 11 decreases to the threshold voltage Vth or less (or the internal resistance value increases to the internal resistance value rth or more), and this control forcibly and temporarily recovers the moisture retaining state of the electrode. For this reason, even if a rated output voltage cannot be obtained due to unsatisfactory moisture on the surface of the fuel cell main body 11 during a long operation or at the start of operation, the output characteristics of the fuel cell can be recovered in a relatively short time. In addition, in the fuel cell apparatus 10 of the present embodiment, while the fuel cell main body 11 is controlled to be in an overcurrent state, temporary use of an electric power compensating means, such as a floating battery or a capacitor, provided in the load control portion 14 can prevent the load device 15 from suffering interruption of the electric power supply.

Figure 3:
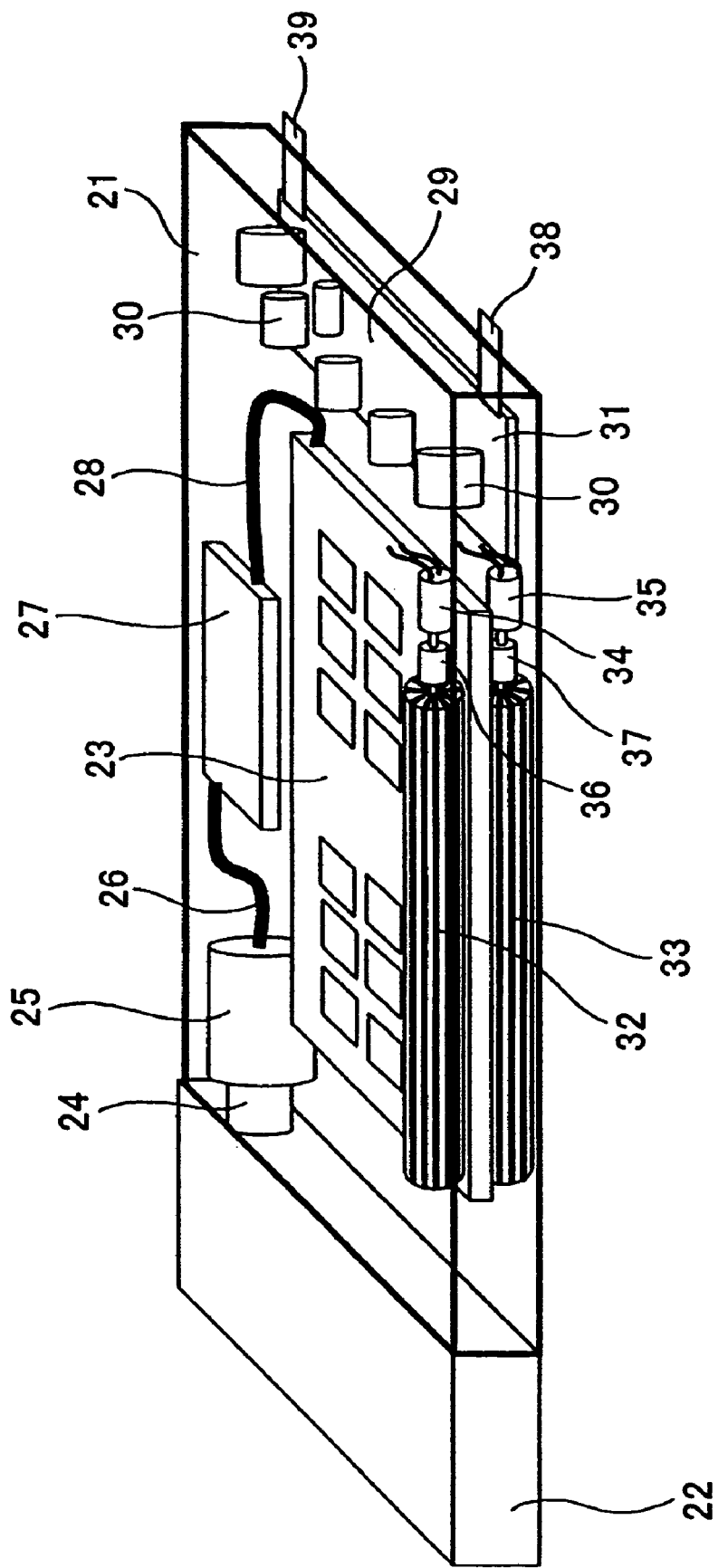
FIG. 3 is a diagrammatic perspective view showing a fuel cell apparatus according to an embodiment of the present invention.

FIG. 3 shows an example of a fuel cell apparatus in which airflow means using fans are formed on one sidewall. A substantially rectangular card-form housing 21 is provided, and in the housing 21 is disposed an electricity generator portion 23. Here, the size of the housing 21 for card-form fuel cell may be a size standardized as PC card as an example, and, specifically, a size standardized by JEIDA/PCMCIA may be applied. A standardized size is such that one side (long side) is 85.6±0.2 mm and another side (short side) is 54.0±0.1 mm. The thickness of a card is specified individually with respect to type I and type II. Specifically, with respect to type I, the thickness of a connector portion is 3.3±0.1 mm, and the thickness of a base portion is 3.3±0.2 mm. With respect to type II, the thickness of a connector portion is 3.3±0.1 mm, and the thickness of a base portion is 5.0 mm or less and ±0.2 mm of the standard dimension of the thickness. The card-form housing 21 may be constructed by stacking an upper housing on a lower housing.

To the card-form housing 21 is connected a hydrogen storage cartridge 22 having substantially the same size as that of the housing in the plane perpendicular to the longitudinal direction of the card-form housing 21 and being capable of being continuously attached to the housing. In the hydrogen storage cartridge 22 is disposed, e.g., a hydrogen storage portion, such as an alloy having hydrogen absorbed therein, and it is detachable from the housing 21 for fuel cell. The hydrogen storage cartridge 22 has a mechanism such that, if being attached, the outlet for fuel is connected to the connector portion to enable the fuel fluid to flow, and, if the hydrogen storage cartridge 22 is detached, the fuel flow from the hydrogen storage cartridge 22 is stopped.

The card-form housing 21 has therein an electricity generating portion 23 comprising four electricity generators combined, a connector portion 24 for introducing the fuel fluid from the hydrogen storage cartridge 22 into the card-form housing 21, an electricity generation-side connector portion 25 for connection to which the connector portion 24 is inserted, a flow control portion 27 connected to the electricity generation-side connector portion 25 through a pipe 26, a pipe 28 for connecting the flow control portion 27 to the electricity generating portion 23, a control circuit portion 29 comprising electronic parts 30 mounted on a wiring board 31, for conducting output control and the like using the electronic parts. Further, in the card-form housing 21, a pair of fans 32, 33 as airflow means are disposed so as to extend along the sidewall of the housing. The fans 32, 33 are driven by, respectively, motors 34, 35, so as to rotate. The fan 32 and the fan 33 are disposed in parallel, especially in the present embodiment, the fan 32 and the fan 33 are disposed in parallel in the vertical direction, and they feed air, respectively, to the upper electricity generator and to the lower electricity generator.

The fans 32, 33 individually have a structure that includes blade portions provided on the periphery of a cylindrical rotating shaft, and each blade portion is formed so that it extends linearly in the direction of the rotating shaft and radially in the direction of the diameter of the rotating shaft. Therefore, the fans 32, 33 rotate around the rotating shaft as a center by driving of the motors 34, 35 to feed air to a space in the housing along not shown grooves in a direction perpendicular to the rotating shaft. The fans 32, 33 may be used for evaporation of water formed on the oxygen-side electrode as mentioned below, and may be used for heat dissipation by feeding air. The fans 32, 33 are connected to the motors 34, 35, respectively, through connectors 36, 37, but the motors 34, 35 may be directly connected, respectively, to the fans 32, 33 without providing connectors 36, 37.

The electricity generating portion 23 is a structure that includes four electricity generators combined, and each electricity generator has a structure including an electrolyte membrane, e.g., a proton conductor disposed between a fuel-side electrode and an oxygen-side electrode, and each of the oxygen-side electrode and the fuel-side electrode include a conductive material, such as a metallic plate, a porous metallic material, a carbon material or the like, and a current collector is connected to the oxygen-side electrode and the fuel-side electrode. The current collector is an electrode material for taking out electromotive force generated in the electrode, and it is made from a metallic material, a carbon material, nonwoven fabric having conductivity or the like. In the four electricity generators, two sets of two stacked electricity generators are arranged in the housing. When two electricity generators are stacked on one another, they may be stacked so that the surfaces of the fuel-side electrodes face to each other and, in this case, fuel fluid is fed to a space between the fuel-side electrodes stacked to enable the electrodes to be activated, and the surfaces which require feeding of oxygen are the oxygen-side electrode surfaces on the surface and back surface of the electricity generators stacked.

The electricity generation-side connector portion 25 is a mechanism portion connected to the connector portion 24 for the hydrogen storage cartridge 22, for introducing fuel fluid into the fuel cell while maintaining the airtightness of the hydrogen storage cartridge 22. Specifically, the electricity generation-side connector portion 25 has a mechanism such that the tip of the connector portion 24 is inserted to the electricity generation-side connector portion 25 and further insertion locks the connector portion to prevent gas leakage during the fitting operation. In a direct methanol system such that the fuel fluid is not hydrogen gas but liquid, a detachable fuel fluid storage tank may be used instead of the hydrogen storage cartridge 22.

A mechanical flow control mechanism may be provided in the electricity generation-side connector portion 25, but, in the fuel cell of the present embodiment, the flow control portion 27 is disposed between the electricity generation-side connector portion 25 and the electricity generating portion 23. The flow control portion 27 is a device for electrically or mechanically keeping the flow rate of the fuel fluid constant, and it may control the pressure using a valve body provided or the like.

The control circuit portion 29 is a circuit for controlling the electromotive force output from the electricity-generating portion 23, and, in the example shown in FIG. 3, the control unit 13 and load control portion 14 having the construction in FIG. 1 are formed. The control circuit portion 29 further may monitor the state of connection to the hydrogen storage cartridge 22 which is the fuel feeding side, and control the output while detecting the state of the load of something to which the output is supplied, for example, control the output voltage according to a mode (e.g., active mode, waiting mode, or sleep mode) of the appliance utilizing the electromotive force.

In addition, a circuit portion for controlling the motors 34, 35 for driving the fans 32, 33 may be provided in the control circuit portion 29. As power supply used for the control circuit portion 29, part of the electric power generated in the electricity-generating portion 23 may be used. A pair of output terminals 38, 39 protrude from the control circuit portion 29, and tips of the output terminals 38, 39 protrude outward from the card-form housing 21.

In the fuel cell apparatus of the present embodiment having the above structure, the fans 32, 33 for feeding oxygen to the fuel cell and for promoting evaporation of water formed on the surface of the oxygen-side electrode are disposed on one sidewall of the card-form housing 21. By rotating the fans 32, 33 to guide air along not shown grooves, efficient removal of water formed on the surface of the oxygen-side electrode can be achieved, making it possible to prevent lowering of the output voltage.

In addition, in the fuel cell apparatus of the present embodiment, the control circuit portion 29 in which the control unit 13 and load control portion 14 having the construction in FIG. 1 are formed is incorporated to the same card-form housing 21, and therefore optimization of the output voltage and control according to the conditions or environment can be easily practiced. Further, the fuel cell apparatus of the present embodiment is not only merely an electricity generation device but also a useful battery having a data processing function. Furthermore, the fuel cell apparatus has a structure such that an occurrence of fluid leakage, such as gas leakage, is prevented at the connector portion, and hence safety of the device is satisfactory.

Figure 4:
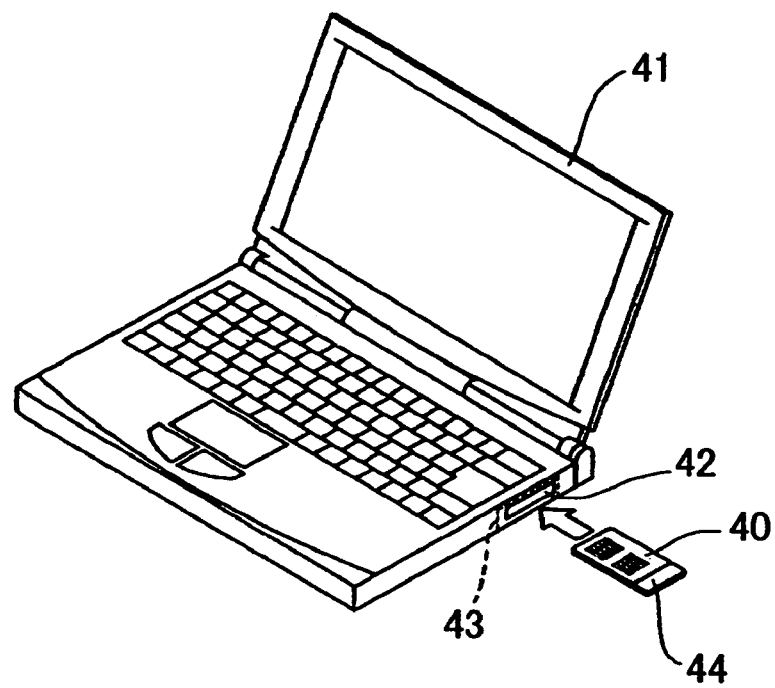
FIG. 4 is a perspective view showing that a fuel cell card according to an embodiment of the present invention is inserted to a laptop personal computer.

Next, an example of a fuel cell apparatus of an open-air type will be described with reference to FIGS. 4 and 5. The fuel cell apparatus of the present invention according to an embodiment may be, as one example, a fuel cell card 40 of a flat plate type having a card form, and the fuel cell card 40 may be, as shown in FIG. 4, attached to a laptop personal computer (PC) 41, which is an apparatus main body, by inserting through a slot 42 for card. Here, the slot 42 may be either a hole which is exclusive to the fuel cell card 40 and formed in the housing of the apparatus main body or a slot having a size standardized by JEIDA/PCMCIA. Specifically, a size standardized by JEIDA/PCMCI is such that one side (long side) is 85.6±0.2 mm and another side (short side) is 54.0±0.1 mm. The thickness of a card is specified individually with respect to type I and type II. Specifically, with respect to type I, the thickness of a connector portion is 3.3±0.1 mm, and the thickness of a base portion is 3.3±0.2 mm. With respect to type II, the thickness of a connector portion is 3.3±0.1 mm, and the thickness of a base portion is 5.0 mm or less and ±0.2 mm of the standard dimension of the thickness. A portion having hydrogen absorbed therein (hydrogen absorption portion) 44 as a portion for feeding a fuel is detachable from the fuel cell card 40.

In FIG. 4, the slot 42 is formed in the sidewall portion of the keyboard-side main body of the laptop PC 41 which is an apparatus main body. Alternatively, a portion in which the slot 42 is formed may be part of a selectable bay 43 indicated by a broken line in FIG. 4. The selectable bay 43 consists of a plurality of functional members detachable from the laptop PC 41. When the extended function of the personal computer is changed, the members incorporated into the selectable bay 43 are exchanged. When using the fuel cell card 40, an exclusive adopter may be externally attached, or a plurality of fuel cell cards 40 may be simultaneously incorporated into a data processing apparatus, e.g., laptop PC 41.

Figure 5:
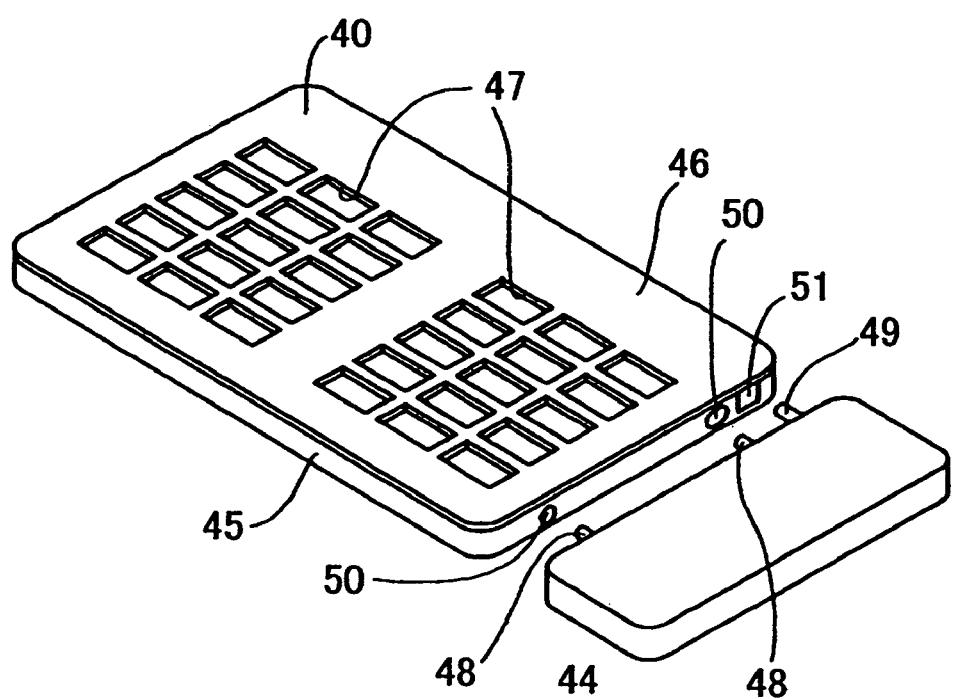
FIG. 5 is a perspective view showing the appearance of the fuel cell card of FIG. 4.

FIG. 5 is a perspective view of the fuel cell card 40 assembled, and the fuel cell card 40, which is formed so that the corner portions are rounded, taking portability into consideration, has a structure such that an upper housing 46 in a flat plate form is combined with a lower housing 45, and, in FIG. 5, the upper housing 46 is fixed to the lower housing 45 by means of, e.g., not shown screws. In the upper housing 46, a plurality of rectangular opening portions 47 is formed as gas inlets for introducing oxygen into the housing.

In this example, each opening portion 47 is a through hole in a substantially rectangular form, and two sets of 15 opening portions consisting of 5 columns×3 rows are formed side by side, and the upper housing 46 has 30 opening portions 47 in total. The opening portions 47 cause the oxygen-side electrode to be open to air as described below, and thus effective drawing of oxygen is realized without any special air suction apparatus, simultaneously with removal of excess moisture.

In the present embodiment, the form of the opening portions 47 is the same as the lattice pattern corresponding to the lattice form of the pattern of the current collectors. Alternatively, it may be other forms, and the form of the individual opening portions may be various forms, such as a circular form, an elliptic form, a stripe form, and a polygonal form. Further, in this example, the opening portions 47 are formed by cutting out the upper housing 46 in a plate form, and, for preventing contaminant or dust from entering or depositing so that the oxygen-side electrode can be surely open to air, net or nonwoven fabric may be provided on the opening portions 47. In the lower housing 45, opening portions corresponding to the opening portions 47 in the upper housing 46 are formed, and their forms are similar and net or nonwoven fabric may be similarly provided.

The hydrogen absorption portion 44 capable of supplying hydrogen is connected to the fuel cell card 40 by fitting a pair of pins 48 formed on the connection-side sidewall of the hydrogen absorption portion 44 into a pair of fitting holes 50 formed in the connection-side sidewall of the lower housing 45. In this instance, a protrusion portion 49 which is a hydrogen feeding inlet of the hydrogen absorption portion 44 is inserted to a rectangular fitting hole 51 formed in the connection-side sidewall of the lower housing 45, and connected to the end portion of a not shown fuel pipe portion extending to the position of the fitting hole 51 in the housing. The hydrogen absorption portion 44 is detachable from the fuel cell card 40, and, for example, when the amount of hydrogen stored in the hydrogen absorption portion 44 is small, the hydrogen absorption portion 44 is detached from the fuel cell card 40 and replaced by another hydrogen absorption portion 44 having satisfactory hydrogen stored therein, or the detached hydrogen absorption portion 44 may be reused by injecting hydrogen thereinto. In this example, the pins 48 of the hydrogen absorption portion 44 are fitted into the fitting hole 51 to attach the hydrogen absorption portion 44 to the fuel cell card 40, but other connection elements may be used and, for example, a structure using insertion to a key groove or a structure using a sliding member which slides against a spring or using a magnet may be employed.

Figure 6:
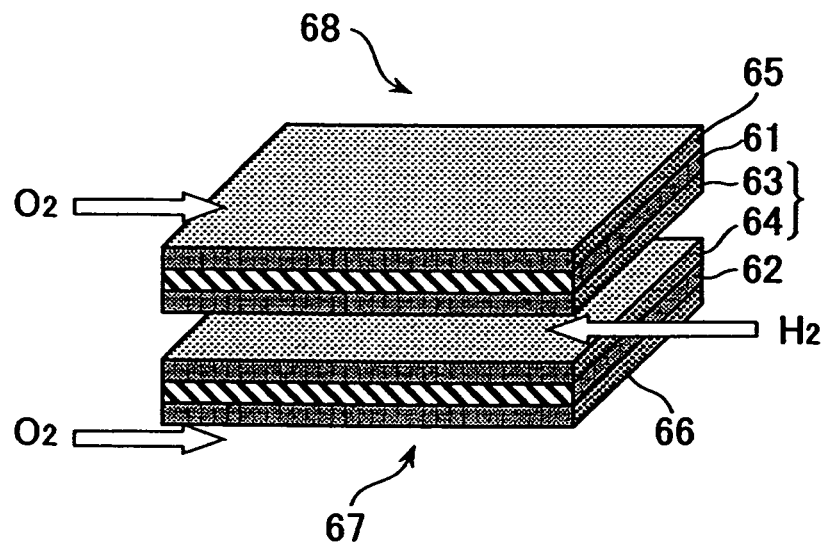
FIG. 6 is a diagrammatic view showing a portion of the fuel cell main body of a fuel cell apparatus according to an embodiment of the present invention.

FIG. 6 is a diagrammatic view showing one example of the fuel cell main body portion. FIG. 6 shows that two electrolyte membrane-electrode composites i.e., MEAs (membrane and electrode assemblies) 67, 68 are stacked, and fuel-side electrodes 63, 64 and oxygen-side electrodes 65, 66 are formed so that proton conductor membranes 61, 62, which are ion-exchange membranes, are individually disposed between the respective electrodes. In the fuel-side electrodes 63, 64 and the oxygen-side electrodes 65, 66, a catalyst material, such as platinum, is formed, and further not shown current collectors for taking out charges are formed. A pair of fuel-side electrodes 63, 64 faces to each other so that they have a desired space between them for introducing hydrogen or the like as a fuel.

Fuel fluid, such as hydrogen gas, is fed from the outside to the fuel-side electrodes 63, 64, and the fuel fluid reaches a reaction region through small holes in the electrodes, and is adsorbed on a catalyst present in the electrodes to form active hydrogen atoms. The hydrogen atoms become hydrogen ions and move to the oxygen-side electrode which is the counter electrode, and feed electrons formed upon ionization to the fuel-side electrodes 63, 64, and the electrons as electromotive force move through a circuit connected to the outside and then reach the oxygen-side electrodes 65, 66.

Each of the oxygen-side electrodes 65, 66 and fuel-side electrodes 63, 64 consists of a conductive material, such as a metallic plate, a porous metallic material, or a carbon material, and a current collector is connected to the oxygen-side electrodes 65, 66 and the fuel-side electrodes 63, 64. The current collector is an electrode material for taking out electromotive force generated in the electrode, and it is constituted using a metallic material, a carbon material, or non-woven fabric having conductivity. In the present embodiment, the two MEAs 67, 68 are stacked so that the fuel-side electrodes 63, 64 are positioned inside, and thus the oxygen-side electrodes 65, 66 are respectively positioned on the surface and back surface of the stacked two MEAs 67, 68. As one example, when using a card-form housing, the MEAs 67, 68 may be individually formed in a substantially rectangular flat plate form of which the longitudinal direction corresponds to the direction of the long side, but they may be in other forms. In addition, the structure of the MEAs 67, 68 is not limited to one including two MEAs stacked, but 4, 6, 8, or more MEAs may be combined. Further, when the individual MEAs have the same form, the same MEAs may be mounted in the fabrication, but it is not limited to this and MEAs having different forms may be combined. For example, an MEA having a larger size and an MEA having a smaller size may be disposed on the same surface, or an MEA having a larger thickness and an MEA having a smaller thickness may be disposed on the same surface. Alternatively, for achieving excellent capacity or efficiency, different types of MEAs having different performance may be mounted in combination in the housing. Further, in the present embodiment, the MEAs 67, 68 disposed in the housing have desired stiffness, and each MEA may have flexibility, and in this case, the housing may be constituted by a material having flexibility. In addition, a structure may be such that the MEA itself is of a desired cartridge type and replaceable. Further, an MEA is shifted, for example, an MEA is slid in the housing and shifted to change the conditions of connection between the MEAs.

Figure 7:
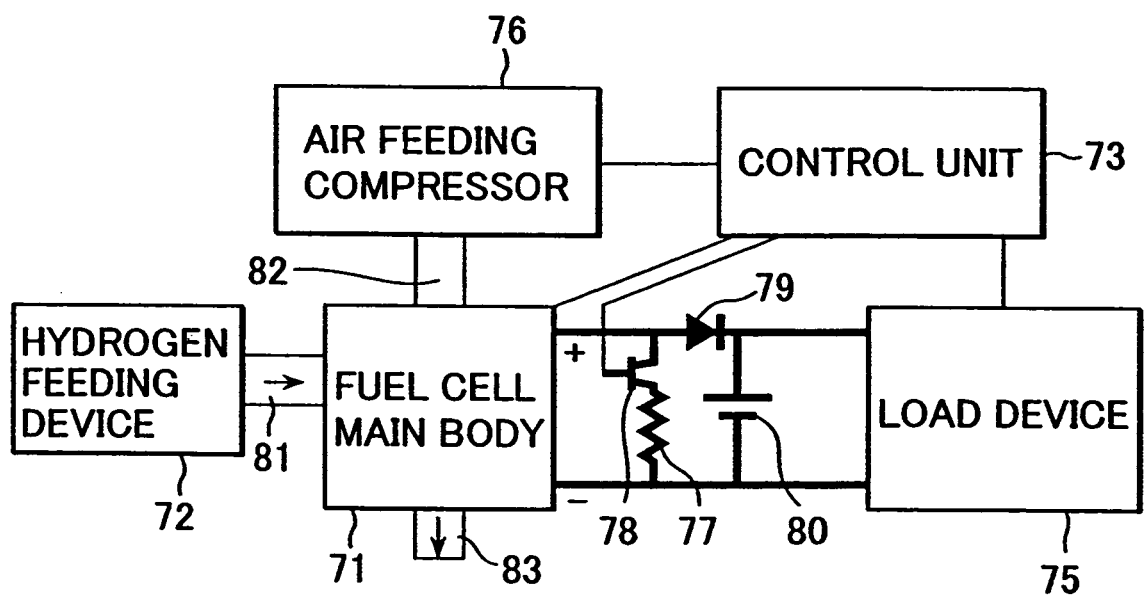
FIG. 7 is a block diagram showing a fuel cell apparatus according to an embodiment of the present invention.

Next, a more detailed embodiment of a fuel cell apparatus of the present invention will be described with reference to FIGS. 7 to 10. First, the fuel cell apparatus according to the present embodiment has, as shown in FIG. 7, a fuel cell main body 71 having a structure formed by stacking on one another a plurality of electricity generators, e.g., MEAs, and further has a control unit 73 for controlling a load and, as a load control portion, connected to the fuel cell main body 71, for permitting the value of a load on the fuel cell main body 71 to vary, a resistance lowering circuit portion including a switching element 78 and a resistance element 77, and a power supply compensating circuit portion including a diode 79 and a floating battery 80. To the fuel cell main body 71 is connected through the load control portion a load device 75 to which the electromotive force generated in the fuel cell main body 71 is fed, and further, to the fuel cell main body 71 is connected a hydrogen feeding device 72 for feeding fuel fluid. In addition, to the fuel cell main body 71 is connected an air feeding compressor 76 for feeding air and evaporating excess moisture.

The fuel cell main body 71 is, as mentioned above, formed by stacking on one another MEAs each including an electrolyte membrane disposed between a fuel-side electrode and an oxygen-side electrode, and hydrogen is fed to the fuel-side electrode and air is fed to the oxygen-side electrode to generate electromotive force between a pair of output terminals. Fuel fluid, such as hydrogen, is fed to the fuel cell main body 71 from the hydrogen-feeding device 72 via a gas feeding passage 81, and the fuel fluid is fed to the fuel-side electrode of the fuel cell main body 71.

The air feeding compressor 76 is a device which changes an atmospheric pressure, e.g., a fan or a pump, and it is a device for feeding oxygen contained in air to the surface of the oxygen-side electrode of the fuel cell main body 71 and for feeding air to evaporate moisture generated on the surface of the oxygen-side electrode. The air feeding compressor 76 and the fuel cell main body 71 may either unify or be detachable from each other as individual members. The air feeding compressor 76 is connected to the fuel cell main body 71 through an air feeding pipe 82, and near the outlet of the air feeding pipe 82 is located the oxygen-side electrode of the fuel cell main body 71. When the oxygen-side electrode is covered with water, the electrode cannot draw oxygen any more, so that the electricity generation characteristics become poor. However, by virtue of the air-feeding compressor 76 provided, unnecessary moisture is evaporated and removed. Therefore, a problem that excess moisture on the oxygen-side electrode lowers the output is prevented. In addition, in the fuel cell main body 71, at the start of operation or during a long operation, there is a concern that the fuel cell main body 71 is disadvantageously dried and the efficiency of ion-exchange in the electrolyte membrane is decreased. However, in the fuel cell apparatus of the present embodiment, it is possible to temporarily allow an overcurrent to flow the fuel cell main body 71, and hence a problem of the dry state of the fuel cell main body 71 can be solved. Air fed to the fuel cell main body 71 is exhausted from the fuel cell main body 71 via an air exhaust pipe 83.

The load device 75 is a device to which the electromotive force generated in the fuel cell apparatus is fed, and, if an apparatus onto which the fuel cell apparatus is mounted is, for example, a personal computer, the fuel cell apparatus is used as a power supply for the personal computer, and therefore the load device 75 corresponds to an internal circuit or a peripheral device. On the other hand, if the fuel cell apparatus is mounted on a transport machine, such as an automobile, the load device corresponds to a device for causing thrust force, such as a motor. Further, if the fuel cell apparatus is used as a household small-size power supply, an electric bulb or a household electric appliance corresponds to the load device 75.

In FIG. 7, the control unit 73 is a device for controlling the below-described resistance lowering circuit portion and power supply compensating circuit portion in the load control portion while monitoring the state of the output or internal resistance of the fuel cell main body 71. The state of the output or internal resistance of the fuel cell main body 71 is monitored by information as signals from the output terminal of the fuel cell, i.e., MEA. In the apparatus of FIG. 7, a method of monitoring the state of the output or internal resistance of the fuel cell main body 71 is employed, but the monitoring method is not limited to this, and the wet degree of each electrode or electrolyte membrane may be directly monitored or a temperature or atmospheric pressure sensor may be used or an output sensor may also be used.

In the present embodiment, the control unit 73 may monitor the operating conditions of the air-feeding compressor 76 or control the action of the air-feeding compressor 76. When controlling the action of the air-feeding compressor 76, by stopping the action of the air-feeding compressor 76 while an overcurrent flows the fuel cell main body 71 to form moisture and recover the electricity generation function, evaporation of moisture may be avoided. In addition, by stopping the action of the air-feeding compressor 76, water formed may rapidly penetrate the electrolyte membrane, thus making it possible to quickly recover the electricity generation performance. Further, the control unit 73 receives information about the electric power consumption state or electric power required in the load device 75, and it can realize electricity generation at high efficiency according to the information.

The fuel cell apparatus of the present embodiment has, as a load control portion for permitting the value of a load current on the fuel cell main body 71 to vary, the resistance lowering circuit portion including the switching element 78 and the resistance element 77, and the power supply compensating circuit portion including the diode 79 and the floating battery 80. The switching element 78 and the resistance element 77 constituting the resistance lowering circuit portion are circuits which act according to signals from the control unit 73, and, for example, as the switching element 78, a semiconductor device in the present embodiment, such as an insulated gate bipolar transistor (IGBT), or a relay or the like may be used. The resistance element 77 has an extremely small resistance value, as compared to the load device 75, and a potential difference generated between the terminals of the element when a current flows has a small value. The switching element 78 and the resistance element 77 are connected in series between a plus terminal and a minus terminal of the output terminals of the fuel cell main body 71, and, when the gate electrode of the switching element 78 is controlled to be on-side, the switching element 78 is in a conduction state, so that the load current on the output terminals of the fuel cell main body 71 increases.

The power supply compensating circuit portion in the load control portion has the diode 79 and the floating battery 80, and the diode 79 serves as a rectifier when the output of the fuel cell main body 71 is decreased. The floating battery 80 is an element which serves as a power supply for the load device 75 instead of the fuel cell main body 71 if in-between a plus terminal and a minus terminal of the output terminals of the fuel cell main body 71 is lowered in resistance according to the action of the resistance lowering circuit portion including the switching element 78 and the resistance element 77. The plus terminal of the floating battery 80 is connected to the plus terminal of the output terminal of the fuel cell main body 71 through the diode 79 and connected to the plus terminal side of the load device 75, and the minus terminal of the floating battery 80 is connected to the minus terminal of the output terminal of the fuel cell main body 71 and connected to the minus terminal side of the load device 75. The floating battery 80 drives the load device 75 by its electromotive force when the switching element 78 is in an on-state. Instead of the floating battery 80, a capacitor or the like may be used.

Figure 8:
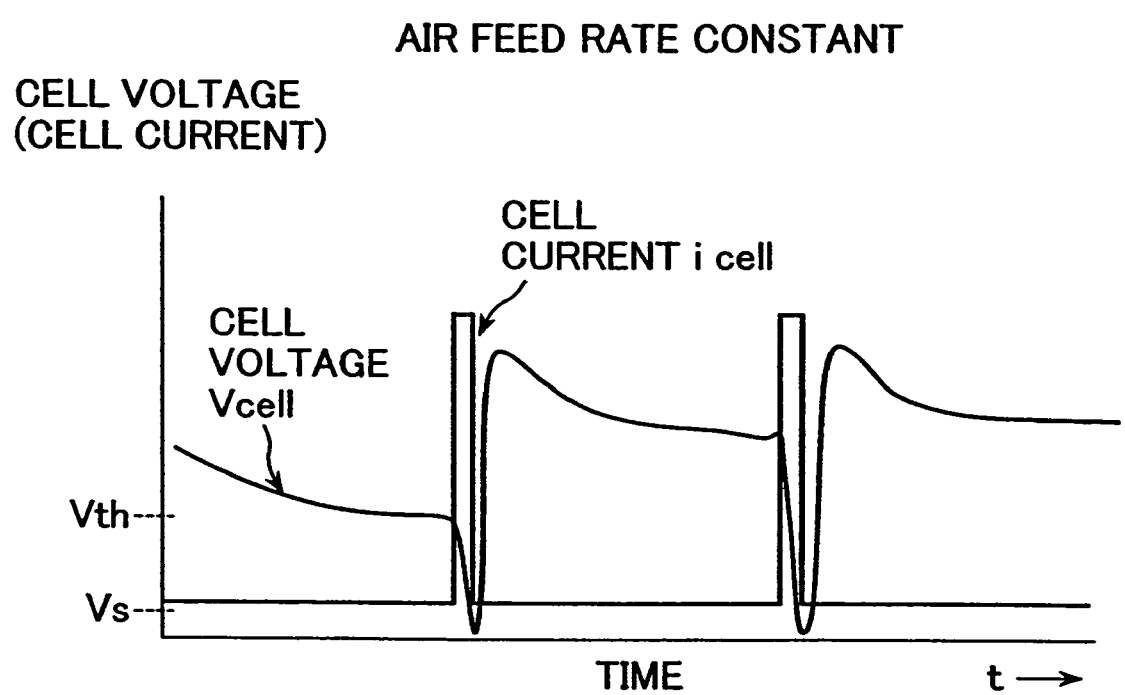
FIG. 8 is a time chart for explaining the operation of the fuel cell apparatus of FIG. 7.

FIG. 8 is one example of a time chart for explaining the operation of the fuel cell apparatus of FIG. 7, and it is an example in which an output voltage when the air feed rate and the load current of the fuel cell are constant is detected as a parameter of the dry state. A time t is taken as the abscissa, and a cell current $i_{cell}$ or a cell voltage $V_{cell}$ when the load current is constant is taken as the ordinate. The cell voltage $V_{cell}$ corresponds to the output voltage Vout of the fuel cell main body 71. In this fuel cell apparatus, when lowering of the output voltage of the fuel cell main body 71 becomes remarkable, the control unit 73 detects the lowering of the output voltage. If it is recognized that the output voltage is not higher than a certain value (Vth in FIG. 2, for example), the switching element 78 is controlled to be in a conduction state according to signals from the control unit 73, so that the resistance lowering circuit portion including the switching element 78 and the resistance element 77 is changed from a general load state or a non-conduction state to a low-resistance state. Then, the fuel cell main body 71 is in a state such that a resistance between the output terminals is lowered or short-circuiting occurs between the output terminals, so that a large cell current $i_{cell}$, i.e., an overcurrent flows the fuel cell main body 71. The overcurrent which flows the fuel cell main body 71 causes oxygen atoms to vigorously bond to hydrogen atoms on the oxygen-side electrode to form water in a large amount temporarily, and, if the output is decreased due to drying, the electrolyte membrane is rapidly in a wet state, making it possible to quickly recover the output.

When an overcurrent flows the fuel cell main body 71, a potential difference between the output terminals, i.e., cell voltage $V_{cell}$ rapidly becomes smaller. Therefore, as shown in FIG. 8, the voltage becomes lower than a predetermined voltage (voltage Vs in FIG. 2, for example) in a relatively short time, and the control unit 73 detects the fact that the output voltage is lower than a predetermined voltage, letting the switching element 78 be in an off-state. Then, the circuit state of the load control portion changes to a general state, so that the current passage via the switching element 78 and the resistance element 77 is shut out. As a result, the cell voltage $V_{cell}$, i.e., output voltage Vout rapidly increases conversely. The output voltage Vout of the fuel cell main body 71 becomes higher again and exceeds the voltage of the floating battery 80, so that electric power is supplied again to the load device 75 from the fuel cell main body 71. In this stage, when an overcurrent flows the fuel cell main body 71, a large amount of water is formed and the electrolyte membrane rapidly becomes in a wet state, thus making it possible to quickly recover the output.

FIG. 8 also shows the case where operation of the fuel cell apparatus is started again, and, when similar output voltage lowering occurs at the start of operation, an overcurrent may similarly flow the fuel cell main body 71 for recovery of the function and the output voltage may be increased similarly. In addition, when the load on the fuel cell main body 11 is at a level such that the self-moistening state can be maintained, the output voltage keeps a predetermined value and electricity generation may be made for a long time while maintaining the output voltage at that value.

The example of FIG. 8 shows the case where the air feeding from the air-feeding compressor 76 is constant. In addition to the above-mentioned control of permitting an overload current to flow the fuel cell main body 71 for recovery of the output function, the air feeding from the air feeding compressor 76 may be controlled, and, for example, while an overcurrent is controlled to flow the fuel cell main body 71 to form moisture to recover the electricity generation function, control of temporarily terminating the action of the air feeding compressor 76 may be made. The temporary termination of the air-feeding compressor 76 may prevent evaporation of moisture and permit the water formed to rapidly penetrate the electrolyte membrane. The suppression of evaporation of moisture and penetration of water formed into the electrolyte membrane make it possible to quickly recover the electricity generation performance.

Figure 9:
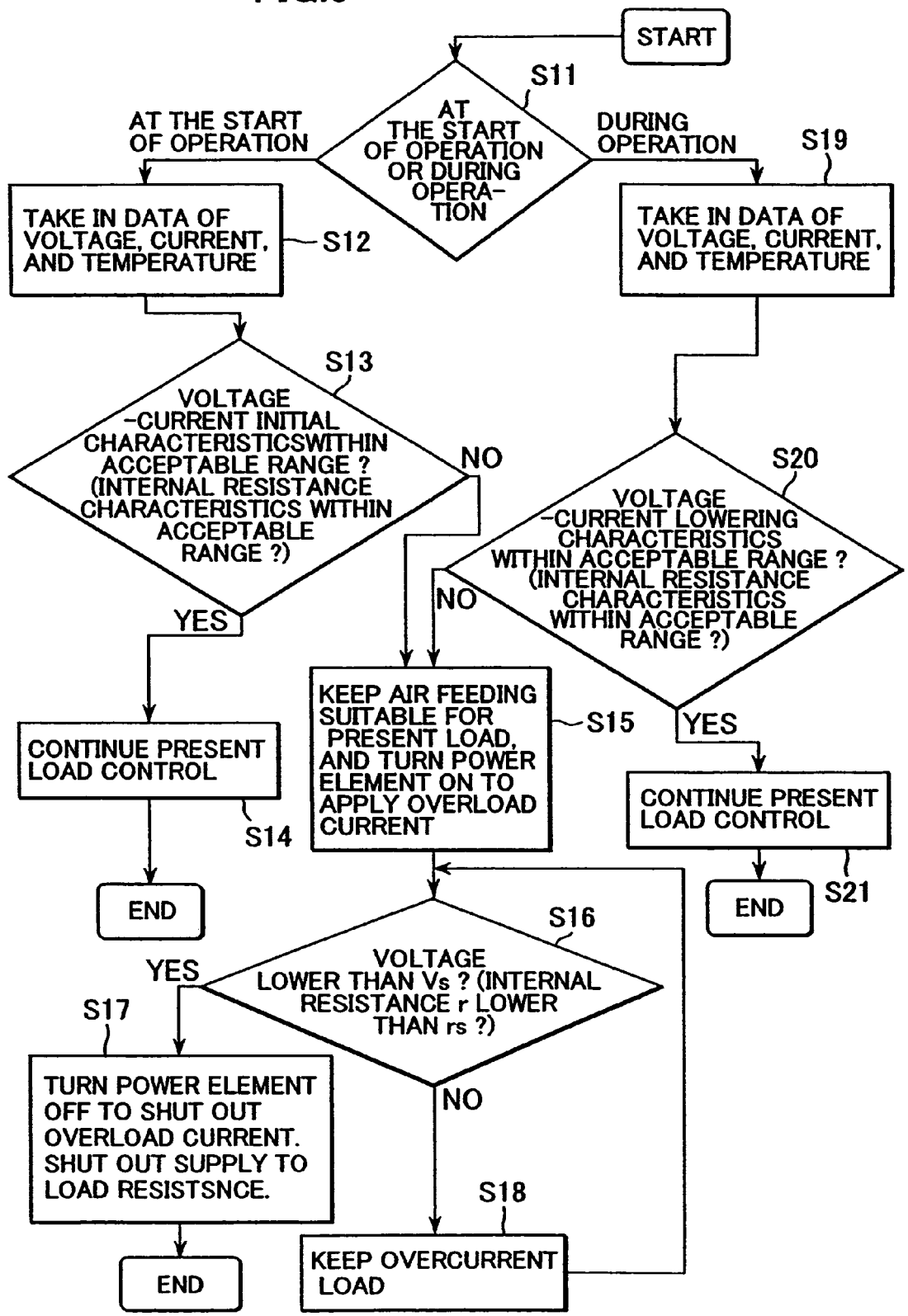
FIG. 9 is a flowchart for explaining the operation of the fuel cell apparatus of FIG. 7.

Next, one example of the flow of steps for operating the fuel cell apparatus according to the present embodiment shown in FIG. 7 will be described with reference to FIG. 9. If the output characteristics or internal resistance characteristics fall outside an acceptable range, the fuel cell apparatus of the present embodiment operates so as to recover them. In this example, the acceptable range immediately after starting the operation of the fuel cell apparatus, namely, at the start of operation and the acceptable range after the operation of the fuel cell apparatus continues for a while, namely, during the operation are different, and therefore the flowchart is constructed so that the processing goes through different flows of steps. These steps are shown in terms of a judgment of the control unit and, for example, steps for control made by the CPU of the control unit 73 in FIG. 7 correspond to the flowchart of FIG. 9.

As a step for control, first, a step S11 judges whether the current stage is immediately after starting the operation of the fuel cell apparatus, i.e., at the start of operation or after the operation of the fuel cell apparatus continues for a while, i.e., during the operation. This may be monitored using a clock or a timer in the control unit 73, and other data, for example, data from the load device side may be used.

When the judgment of the step S11 is "at the start of operation", the processing goes to a step S12 and the control unit 73 takes in data of a voltage, a current, and a temperature from the fuel cell main body 71. Then, the voltage-current characteristics or internal resistance characteristics of the fuel cell main body 71 upon taking in the data are detected or calculated by these parameters, and a step S13 judges whether or not the voltage-current initial characteristics or internal resistance characteristics fall within the acceptable range. When the voltage-current initial characteristics or internal resistance characteristics of the fuel cell main body 71 upon taking in the data fall within the acceptable range (YES), the processing goes to a step S14, and it is recognized that the present operating conditions are good and hence the present load control is continued, so that the processing is terminated.

When the voltage-current initial characteristics or internal resistance characteristics of the fuel cell main body 71 upon taking in the data are judged to fall outside the acceptable range (NO), the processing goes to a step S15, and the air feeding from the air feeding compressor 76 maintains a feed rate suitable for a general load, and, in order to permit an overload current to flow the fuel cell main body 71, a power element, such as the switching element 78, is controlled to be changed from off to on to permit a current to flow the resistance element 77 having a low resistance. Thus, a large amount of oxygen is consumed on the oxygen-side electrode of the fuel cell main body 71 to form moisture, and the water formed causes the electrolyte membrane to be in a wet state. Therefore, if the output is decreased due to drying, the electrolyte membrane is rapidly in a wet state, making it possible to quickly recover the output. Further, in this term, electric power cannot be supplied from the fuel cell main body 71, but the load device 75 may temporarily use electric power from the floating battery 80, and thus a problem of instantaneous interruption caused by the control of electric power may be effectively avoided.

After controlling a power element, such as the switching element 78, to be on in order to permit an overload current to flow the fuel cell main body 71, the processing goes to a step S16 to judge whether or not the output voltage Vout is lower than the voltage Vs (whether or not the internal resistance value r is lower than rs). When the output voltage Vout is not judged to be lower than the voltage Vs (the internal resistance value r is not judged to be lower than rs) (NO), the processing goes to a step S18 and the overload current which flows the fuel cell main body 71 is maintained as it is, so that the processing goes back to the step S16 to judge the conditions again.

When the processing goes to the step S16 and the output voltage Vout is judged to be lower than the voltage Vs (the internal resistance value r is judged to be lower than rs) (YES), it is recognized that recovery of the function has already been achieved by the water formed in the fuel cell main body 71, so that the overload current which flows the fuel cell main body 71 is shut out. Therefore, a power element, such as the switching element 78, is controlled to be in an off-state from an on-state. Thus, the controlling of the switching element 78 to be in an off-state shuts out the current which flows the resistance element 77 (step S17) and the overload current which flows the fuel cell main body 71 simultaneously. As a result, the load on the fuel cell main body 71 becomes a general load, and the output voltage Vout, as shown in, for example, FIG. 2 or FIG. 8, becomes an initial value.

Next, when a predetermined period of time lapses from the start of operation, that is, the stage is during the operation, the step S11 judges "during the operation" and the processing goes to a step S19, and the control unit 73 takes in data of a voltage, a current, and a temperature from the fuel cell main body 71. Then, the voltage-current characteristics or internal resistance characteristics of the fuel cell main body 71 upon taking in the data are detected or calculated by these parameters, and a step S20 judges whether or not the voltage-current lowering characteristics or internal resistance increase characteristics during the operation fall within the acceptable range. When the voltage-current lowering characteristics or internal resistance increase characteristics of the fuel cell main body 71 upon taking in the data fall within the acceptable range (YES), the processing goes to a step S21, and it is recognized that the present operating conditions are good and hence the present load control is continued, so that the processing is terminated.

When the voltage-current lowering characteristics or internal resistance increase characteristics of the fuel cell main body 71 upon taking in the data fall outside the acceptable range (NO), the processing goes to the step S15, and the air feeding from the air feeding compressor 76 maintains a feed rate suitable for a general, and, in order to permit an overload current to flow the fuel cell main body 71, a power element, such as the switching element 78, is controlled to be changed from off to on to permit a current to flow the resistance element 77 having a low resistance. Thus, a large amount of oxygen is consumed on the oxygen-side electrode of the fuel cell main body 71 to form moisture, and the water formed causes the electrolyte membrane to be in a wet state. Therefore, when the output is lowered due to drying, the electrolyte membrane is rapidly in a wet state, making it possible to quickly recover the output. Further, in this term, electric power cannot be supplied from the fuel cell main body 71, but the load device 75 may temporarily use electric power from the floating battery 80, and thus a problem of instantaneous interruption caused by the control of electric power may be effectively avoided.

Like at the start of operation, after controlling a power element, such as the switching element 78, to be on in order to permit an overload current to flow the fuel cell main body 71, the processing goes to the step S16 to judge whether or not the output voltage Vout is lower than the voltage Vs (whether or not the internal resistance value r is lower than rs). When the output voltage Vout is not judged to be lower than the voltage Vs (the internal resistance value r is not judged to be lower than rs) (NO), the processing goes to the step S18 and the overload current which flows the fuel cell main body 71 is maintained as it is, so that the processing goes back to the step S16 to judge the conditions again.

When the processing goes to the step S16 and the output voltage Vout is judged to be lower than the voltage Vs (the internal resistance value r is judged to be lower than rs) (YES), it is recognized that recovery of the function has already been achieved by the water formed in the fuel cell main body 71, so that the overload current which flows the fuel cell main body 71 is shut out. Therefore, a power element, such as the switching element 78, is controlled to be in an off-state from an on-state. Thus, the controlling of the switching element 78 to be in an off-state shuts out the current which flows the resistance element 77 (step S17) and the overload current which flows the fuel cell main body 71 simultaneously. As a result, the load on the fuel cell main body 71 becomes a general load, and the output voltage Vout, as shown in, for example, FIG. 2 or FIG. 8, becomes an initial value.

According to the flow of steps described above, the fuel cell apparatus of the present embodiment judges whether or not the voltage-current characteristics or internal resistance characteristics, which are the output characteristics from the fuel cell main body, fall within an acceptable range, and, when the characteristics fall outside the acceptable range, the switching element is controlled to be in an on-state to permit an overload current to flow the fuel cell main body. After permitting an overload current to flow, the output voltage or internal resistance value is similarly checked, and, when the value is lower than a certain level, the switching element is controlled to be in an off-state to stop the overload current into the fuel cell main body. Therefore, the output characteristics of the fuel cell main body may be recovered in a relatively short time, and its control is conducted while monitoring the output characteristics or internal resistance increase characteristics and hence no unnecessary operation for recovery is made. Particularly, the voltage-current characteristics or internal resistance increase characteristics, which are the output characteristics from the fuel cell main body, and which fall within or outside an acceptable range, are controlled in different ways at the start of operation and during the operation and thus, even when the state of the electrolyte membrane is slightly changed, controls suitable for respective cases may be conducted.

Next, a fuel cell apparatus according to another embodiment will be described with reference to FIG. 10. The apparatus of FIG. 10 has a fuel cell main body 91 having a structure formed by stacking on one another a plurality of electricity generators, e.g., MEAs, and further has a control unit 93 for controlling a load and, as a load control portion, connected to the fuel cell main body 91, for permitting the value of a load on the fuel cell main body 91 to vary, a DC-DC transducer 97, and a power supply compensating circuit portion including a diode 99 and a floating battery 98. The power supply compensating circuit portion serves as a bypass circuit which electrically connects the electrodes when the output voltage is not higher than a threshold voltage. To the fuel cell main body 91 is connected through the load control portion a load device 95 to which the electromotive force generated in the fuel cell main body 91 is fed, and further, to the fuel cell main body 91 is connected a hydrogen feeding device 92 for feeding fuel fluid via a fuel feeding pipe 101. In addition, to the fuel cell main body 91 is connected an air feeding compressor 96 for feeding air and evaporating excess moisture. Air from the air feeding compressor 96 is fed to the fuel cell main body 91 via an air feeding pipe 102, and exhausted via an air exhaust pipe 103, together with excess moisture and the like.

Figure 10:
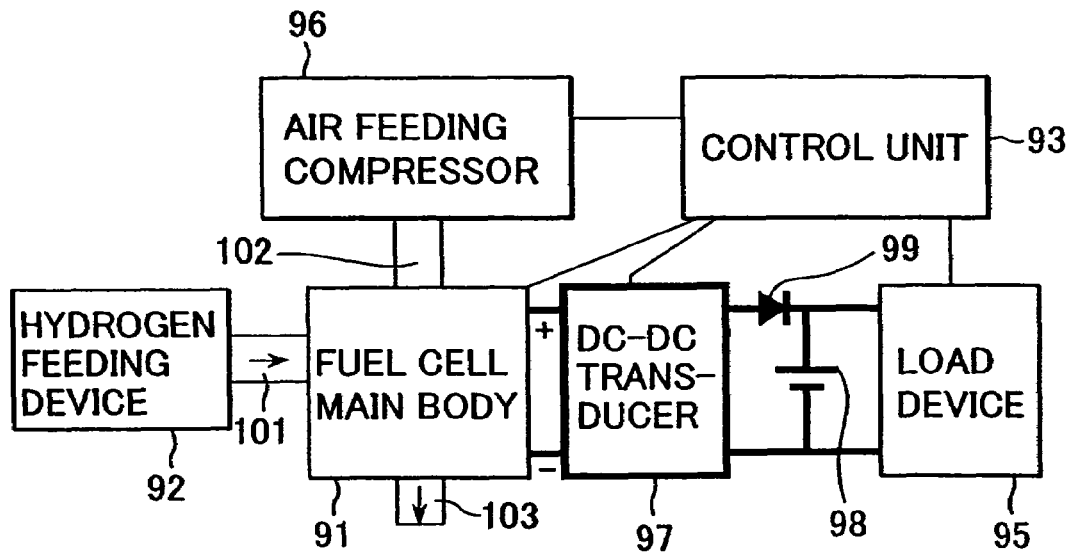
FIG. 10 is a block diagram showing a fuel cell apparatus according to an embodiment of the present invention.

In the apparatus of FIG. 10, the fuel cell main body 91, the hydrogen feeding device 92, the control unit 93, the load device 95, and the air feeding compressor 96 have, respectively, the same constructions as those of the corresponding devices shown in FIG. 7, and overlapping description is omitted for simplifying the descriptions. The apparatus of FIG. 10 has substantially the same construction as that of the apparatus of FIG. 7 except that the DC-DC transducer 97 is provided instead of the resistance lowering circuit, and the DC-DC transducer 97 may increase the primary input current according to the control signals from the control unit 93. Specifically, the DC-DC transducer 97 has a function of remarkably increasing the primary input current when the voltage-current characteristics or internal resistance increase characteristics, which are the output characteristics from the fuel cell main body, fall outside an acceptable range, thus letting an overcurrent flow the fuel cell main body. The overcurrent consumes a large amount of oxygen on the oxygen-side electrode of the fuel cell main body 91 to form moisture, so that the water formed causes the electrolyte membrane to be in a wet state. Therefore, when the output is lowered due to drying, the electrolyte membrane is rapidly in a wet state, making it possible to quickly recover the output. Further, in this term, electric power cannot be supplied from the fuel cell main body 91, but the load device 95 may temporarily use electric power from the floating battery 98, and thus a problem of instantaneous interruption caused by the control of electric power may be effectively avoided.

In the above embodiment, the apparatus has a construction such that short-circuiting is caused between a pair of output terminals by an electric circuit or the resistance between the output terminals is lowered in order to allow an overcurrent to flow the fuel cell main body, but the method is not limited to the one operating the resistance value between the output terminals, and a means for causing short-circuiting or lowering of the resistance between the fuel-side electrode and the oxygen-side electrode may be formed in the MEA itself or current collector or the like, and either a single or a plurality of means for causing short-circuiting or lowering of the resistance may be formed. Further, for achieving uniform function recovery treatment in the electrolyte membrane, wiring for letting an overcurrent flow the fuel cell main body may be provided.

In addition, in the present embodiment, an explanation is made on an example in which a predetermined operation for recovery of the output characteristics is conducted while monitoring the output voltage or internal resistance of the fuel cell main body, but the operation is not limited to this, and a predetermined operation for recovery of the output characteristics may be made automatically using a timer or the like, and especially at the start of operation, excellent results may be obtained using a timer. When the fuel cell main body includes a plurality of electricity generators, all the electricity generators may be subjected to overcurrent treatment at the same time, but the electricity generators may be successively subjected to treatment so that an overcurrent is applied to the individual electricity generators with a time lag.

Further, the control unit 93 may be used for both the control of a load and the air feeding as mentioned below.

Figure 11:
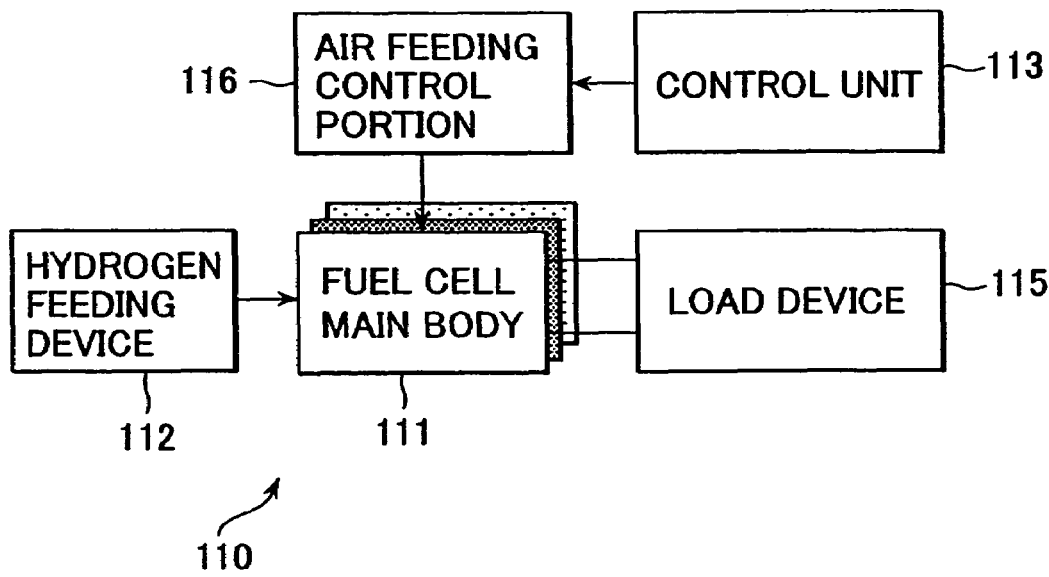
FIG. 11 is a block diagram showing a fuel cell apparatus according to an embodiment of the present invention.

A preferred embodiment of a fuel cell apparatus of the present invention according to an embodiment will be described with reference to the drawings. FIG. 11 is a block diagram showing a fuel cell apparatus according to the present embodiment. A fuel cell apparatus 110 of the present embodiment has a fuel cell main body 111 for generating electromotive force, a control unit 113 for controlling a load, and an air feeding control portion 116 for feeding air to the fuel cell main body 111, and electromotive force is generally supplied to a load device 115 from an output terminal of the fuel cell main body 111, and a hydrogen feeding device 112 for feeding fuel fluid is connected to the fuel cell main body 111.

The fuel cell main body 111 has a structure described below as an example such that an electrolyte membrane in a substantially flat plate form is disposed between a fuel-side electrode and an oxygen-side electrode, and fuel fluid, such as hydrogen gas or methanol, is fed to the fuel-side electrode from the hydrogen feeding device 112 having a hydrogen storage function. The oxygen-side electrode is an electrode for drawing oxygen contained in air, and it is opposite to the fuel-side electrode through the electrolyte membrane. The oxygen-side electrode may be of an open-air type, and may have a structure to which air is fed by means of a compressor, a pump, or a fan. The fuel cell main body 111 may be either in a stack laminate form obtained by stacking on one another a plurality of structures each including the electrolyte membrane in a substantially flat plate form disposed between the fuel-side electrode and the oxygen-side electrode, or in a flat plate form consisting of one structure or two structures stacked.

The hydrogen feeding device 112 is a device for feeding fuel fluid, such as hydrogen gas or an alcohol, e.g., methanol, to the fuel cell main body 111 and, as an example, a hydrogen high-pressure tank or a cartridge containing an alloy having hydrogen absorbed therein may be used. The hydrogen feeding device 112 may be detachable from the fuel cell main body 111 as mentioned below, and may be of a structure such that transmission and reception of information about the fuel conditions are conducted at a joint portion.

The control unit 113 is a controller for controlling the fuel cell apparatus 110, and it monitors the state of the output or internal resistance of the fuel cell in the fuel cell main body 111 and outputs signals for control according to the state of the output or internal resistance to the air feeding control portion 116. The control unit 113 consists of desired electronic circuits, CPU (central processing unit) and the like, and the control unit 113 and the fuel cell main body 111 do not necessarily unify, but may be individually fitted, or part of the data processing unit of an electronic appliance having the fuel cell main body 111 mounted may be utilized. In the present embodiment, the control unit 113 monitors the output voltage or internal resistance value of the fuel cell, but monitoring is not limited to this, and the output current may be monitored or the conditions including a temperature, a humidity, and an atmospheric pressure may be monitored simultaneously.

The air feeding control portion 116 is a control portion for permitting air fed to the fuel cell main body 111 to vary depending on the state of the output or internal resistance of the fuel cell main body 111. It is a device which changes an atmospheric pressure, e.g., a compressor, a fan, or a pump, and is a device for feeding oxygen contained in air to the surface of the oxygen-side electrode of the fuel cell main body 111 and for feeding air to evaporate moisture generated on the surface of the oxygen-side electrode. The air feeding control portion 116 and the fuel cell main body 111 may either unify or be detachable from each other as individual members.

The load device 115 is a device to which the electromotive force generated in the fuel cell apparatus 110 is fed, and, when an apparatus onto which the fuel cell apparatus 110 is mounted is, for example, a personal computer, the fuel cell apparatus 110 is used as a power supply for the personal computer, and therefore the load device 115 corresponds to an internal circuit or a peripheral device. On the other hand, when the fuel cell apparatus 110 is mounted on a transport machine, such as an automobile, the load device corresponds to a device for causing thrust force, such as a motor. Further, when the fuel cell apparatus 110 is used as a household small-size power supply, an electric bulb or a household electric appliance corresponds to the load device.

In order to let the fuel cell main body 111 be in an overcurrent state, a switching element may be disposed between the output terminals of the fuel cell main body 111 to cause short-circuiting so that the switch element is in an ON-state. Alternatively, in order to let the fuel cell main body 111 be in an overcurrent state, the output terminals of the fuel cell main body 111 may be connected by a low-resistance element.

Figure 12:
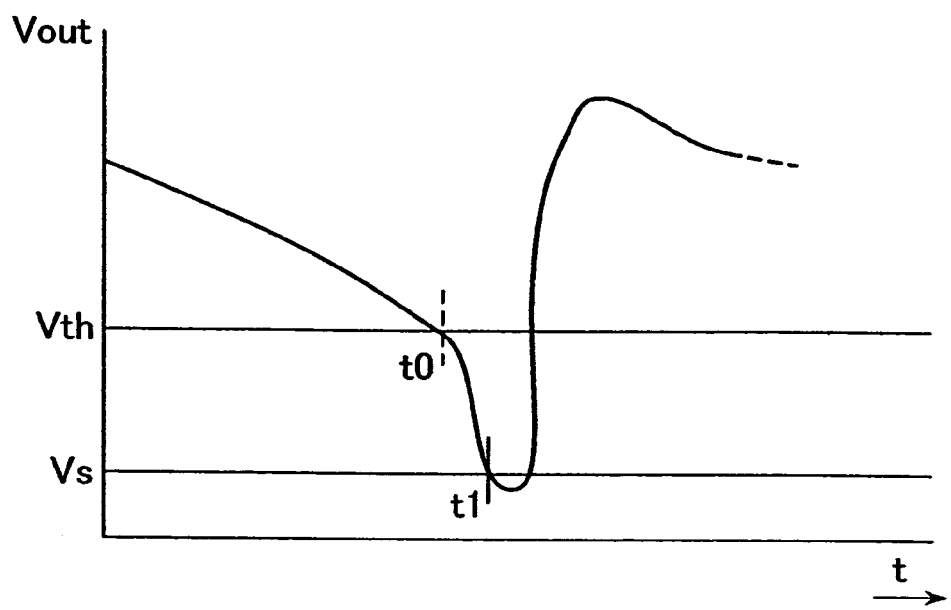
FIG. 12 is a time chart showing the output voltage of the fuel cell apparatus according to an embodiment.

Next, one example of the operation of the air feeding control portion 116 will be described with reference to FIG. 12. In FIG. 12, an output voltage Vout of the fuel cell main body when the load current is constant is taken as the ordinate, and a time t is taken as the abscissa. In the fuel cell apparatus 110 of FIG. 11, the voltage Vout is maintained at a relatively large value at first, but, as the operation continues, drying of the electrode on the surface of the fuel cell main body 111 may proceed due to the environment for use. As a result, the output voltage Vout of the fuel cell main body 111 gradually decreases and becomes lower than a threshold voltage Vth at a point in time $t_0$. The threshold voltage Vth is a reference level indicating that the output of the fuel cell in the fuel cell main body 111 is low, and, when it is recognized that the output voltage Vout of the fuel cell main body 111 is lower than the threshold voltage Vth on the control unit 113 side, the control unit 113 detects that the output of the fuel cell in the fuel cell main body 111 is low, performing an operation for recovery of the function. Specifically, signals are transmitted from the control unit 113 to the air feeding control portion 116 to, for example, temporarily stop air feeding from the air feeding control portion 116.

By letting the air feeding control portion 116 be in an air feeding termination state, evaporation of moisture on the surface of the fuel cell main body 111 is suppressed, so that the dried surface of the fuel cell main body 111 may be in a wet state in a short time. When the air feeding control portion 116 is in an air feeding termination state, a load current flows the fuel cell, and drawing of oxygen atoms by ion exchange causes moisture to form. For this reason, the surface of the fuel cell main body 111 may be in a wet state in an extremely short time. While the air feeding control portion 116 is in an air feeding termination state as mentioned above, electric power supply to the subsequent load device 115 is unsatisfactory as it is, but temporary use of an electric power compensating means described below, such as a floating battery or a capacitor, prevents the load device 115 from suffering interruption of the electric power supply.

When the air feeding control portion 116 is in an air feeding termination state, the output voltage Vout of the fuel cell main body 111 rapidly decreases, and the output voltage Vout becomes lower than a voltage Vs at a point in time $t_1$ in FIG. 12, so that the decreasing of the output voltage Vout to this point is detected by the control unit 113 side. As a result, the control unit 113 transmits signals for terminating the operation for recovery of the function of the fuel cell to the air feeding control portion 116. According to the signals, the air feeding control portion 116 changes the mode of the apparatus from the air feeding termination state to a general air feeding operation state.

As a parameter for detecting the dry state of the fuel cell main body 111, instead of the above-mentioned output voltage Vout of the fuel cell main body when the load current is constant, an internal resistance value r may be used in accordance with, for example, a current interrupt method. In this case, when the internal resistance value r exceeds a certain value, similar control to the one described above causes the fuel cell main body 111 to be in an air feeding termination state, enabling the dried surface of the fuel cell main body 111 to be in a wet state in a short time.

Thus, in the fuel cell apparatus 110 of the present embodiment, control is made so that the air feeding control portion 116 becomes in an air feeding termination state to let the fuel cell main body 111 be in an overcurrent state when the output voltage Vout from the fuel cell main body 111 decreases to the threshold voltage Vth or less (or the internal resistance value increases to the internal resistance value rth or more), and this control forcibly and temporarily recovers the moisture retaining state of the electrode. For this reason, even when a rated output voltage cannot be obtained due to unsatisfactory moisture on the surface of the fuel cell main body 111 during a long operation or at the start of operation, the output characteristics of the fuel cell may be recovered in a relatively short time. In addition, in the fuel cell apparatus 110 of the present embodiment, while the air feeding control portion 116 is in an air feeding termination state, the output voltage is lowered, and therefore an electric power compensating means described below, such as a floating battery or a capacitor, may be temporarily used.

Figure 13:
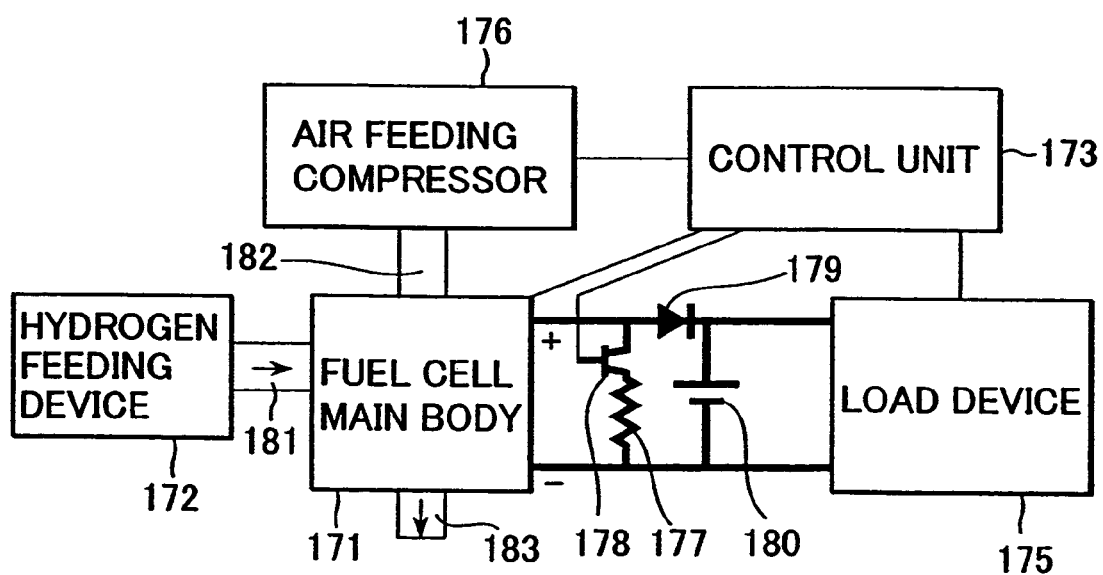
FIG. 13 is a block diagram showing a fuel cell apparatus according to an embodiment of the present invention.

Next, another embodiment of a fuel cell apparatus of the present invention will be described with reference to FIGS. 13 to 15. First, the fuel cell apparatus according to the present embodiment has, as shown in FIG. 13, a fuel cell main body 171 having a structure formed by stacking on one another a plurality of electricity generators, e.g., MEAs, and further has a control unit 173 for controlling a load and, as a load control portion, connected to the fuel cell main body 171, for permitting the value of a load on the fuel cell main body 171 to vary, a resistance lowering circuit portion including a switching element 178 and a resistance element 177, and a power supply compensating circuit portion including a diode 179 and a floating battery 180. To the fuel cell main body 171 is connected through the load control portion a load device 175 to which the electromotive force generated in the fuel cell main body 171 is fed, and further, to the fuel cell main body 171 is connected a hydrogen feeding device 172 for feeding fuel fluid. In addition, to the fuel cell main body 171 is connected an air feeding compressor 176 as an air feeding control portion for feeding air and evaporating excess moisture. The air-feeding compressor 176 serves as the air feeding control portion 116 of FIG. 11.

The fuel cell main body 171 is, as mentioned above, formed by stacking on one another MEAs each including an electrolyte membrane disposed between a fuel-side electrode and an oxygen-side electrode, and hydrogen is fed to the fuel-side electrode and air is fed to the oxygen-side electrode to generate electromotive force between a pair of output terminals. Fuel fluid, such as hydrogen, is fed to the fuel cell main body 171 from the hydrogen-feeding device 172 via a gas feeding passage 181, and the fuel fluid is fed to the fuel-side electrode of the fuel cell main body 171.

The air feeding compressor 176 is a device which serves as an air feeding control portion, and which consists of a mechanism for changing an atmospheric pressure, e.g., a fan or a pump, and it is a device for feeding oxygen contained in air to the surface of the oxygen-side electrode of the fuel cell main body 171 and for feeding air to evaporate moisture generated on the surface of the oxygen-side electrode. The air feeding compressor 176 and the fuel cell main body 171 may either unify or be detachable from each other as individual members. The air feeding compressor 176 is connected to the fuel cell main body 171 through an air feeding pipe 182, and near the outlet of the air feeding pipe 182 is located the oxygen-side electrode of the fuel cell main body 171. When the oxygen-side electrode is covered with water, the electrode cannot draw oxygen any more, so that the electricity generation characteristics become poor. However, by virtue of the air-feeding compressor 176 provided, unnecessary moisture is evaporated and removed. Therefore, a problem that excess moisture on the oxygen-side electrode lowers the output is prevented. In addition, in the fuel cell main body 171, at the start of operation or during a long operation, there is a concern that the fuel cell main body 171 is disadvantageously dried and the efficiency of ion-exchange in the electrolyte membrane is decreased, but, in the fuel cell apparatus of the present embodiment, the fuel cell main body 171 may temporarily be in an air feeding termination state, and hence a problem of the dry state of the fuel cell main body 171 may be solved. Air fed to the fuel cell main body 171 is exhausted from the fuel cell main body 171 via an air exhaust pipe 183.

The load device 175 is a device to which the electromotive force generated in the fuel cell apparatus is fed, and, when an apparatus onto which the fuel cell apparatus is mounted is, for example, a personal computer, the fuel cell apparatus is used as a power supply for the personal computer, and therefore the load device 175 corresponds to an internal circuit or a peripheral device. On the other hand, when the fuel cell apparatus is mounted on a transport machine, such as an automobile, the load device corresponds to a device for causing thrust force, such as a motor. Further, when the fuel cell apparatus is used as a household small-size power supply, an electric bulb or a household electric appliance corresponds to the load device 175.

In FIG. 13, the control unit 173 is a device for controlling the below-described air-feeding compressor 176, and the resistance lowering circuit portion and power supply compensating circuit portion in the load control portion while monitoring the state of the output or internal resistance of the fuel cell main body 171. The state of the output or internal resistance of the fuel cell main body 171 is monitored by information as signals from the output terminal of the fuel cell, i.e., MEA. In the apparatus of FIG. 13, a method of monitoring the state of the output or internal resistance of the fuel cell main body 171 is employed, but the monitoring method is not limited to this, and the wet degree of each electrode or electrolyte membrane may be directly monitored or a temperature or atmospheric pressure sensor may be used or an output sensor may also be used. The control unit 173 may directly monitor the operating conditions of the air-feeding compressor 176.

When controlling the action of the air-feeding compressor 176 in order to recover the electricity generation function, a current is allowed to flow the fuel cell main body 171 to form water. Specifically, by stopping the action of the air-feeding compressor 176, evaporation of moisture may be prevented and further the water formed may rapidly penetrate the electrolyte membrane. The air feeding from the air-feeding compressor 176 may be stopped in a relatively short term to quickly recover the electricity generation performance. Further, the control unit 173 receives information about the electric power consumption state or electric power required in the load device 175, and it may realize electricity generation at high efficiency according to the information.

In addition to the control of the air feeding operation of the air feeding compressor 176, the fuel cell apparatus of the present embodiment has, as a load control portion for permitting the value of a load current on the fuel cell main body 171 to vary, the resistance lowering circuit portion including the switching element 178 and the resistance element 177, and the power supply compensating circuit portion including the diode 179 and the floating battery 180. The switching element 178 and the resistance element 177 constituting the resistance lowering circuit portion are circuits which act according to signals from the control unit 173, and, for example, as the switching element 178, a semiconductor device in the present embodiment, such as an insulated gate bipolar transistor (IGBT), or a relay or the like may be used. The resistance element 177 has an extremely small resistance value, as compared to the load device 175, and a potential difference generated between the terminals of the element when a current flows has a small value. The switching element 178 and the resistance element 177 are connected in series between a plus terminal and a minus terminal of the output terminals of the fuel cell main body 171, and, when the gate electrode of the switching element 178 is controlled to be on-side, the switching element 178 is in a conduction state, so that the load current on the output terminals of the fuel cell main body 171 increases.

The power supply compensating circuit portion in the load control portion has the diode 179 and the floating battery 180, and the diode 179 serves as a rectifier when the output of the fuel cell main body 171 is lowered. The floating battery 180 is an element which serves as a power supply for the load device 175 instead of the fuel cell main body 171 when in-between a plus terminal and a minus terminal of the output terminals of the fuel cell main body 171 is lowered in resistance according to the action of the resistance lowering circuit portion including the switching element 178 and the resistance element 177. The plus terminal of the floating battery 180 is connected to the plus terminal of the output terminal of the fuel cell main body 171 through the diode 179 and connected to the plus terminal side of the load device 175, and the minus terminal of the floating battery 180 is connected to the minus terminal of the output terminal of the fuel cell main body 171 and connected to the minus terminal side of the load device 175. The floating battery 180 drives the load device 175 by its electromotive force when the switching element 178 is in an on-state. Instead of the floating battery 180, a capacitor or the like may be used.

Figure 14:
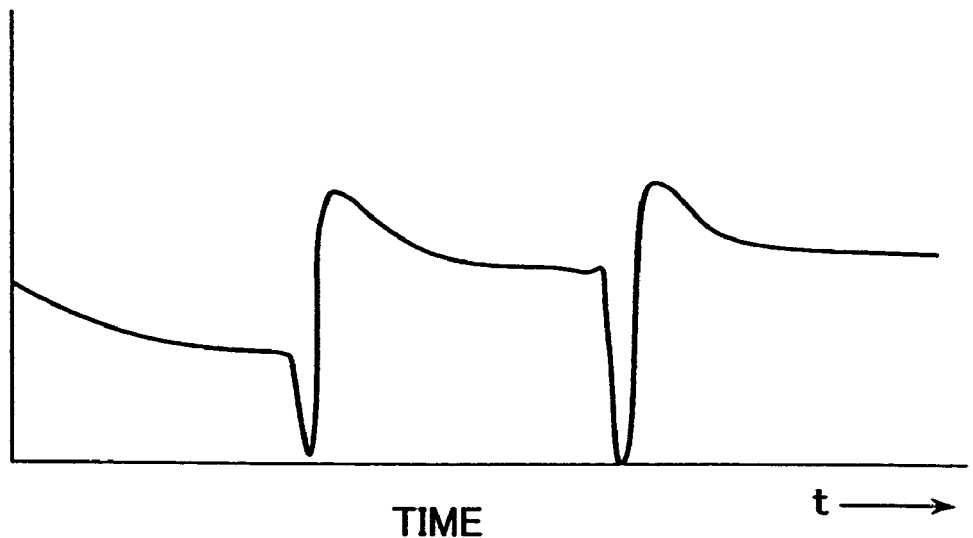
FIG. 14 is a time chart for explaining the operation of the fuel cell apparatus of FIG. 13.
Figure 15:
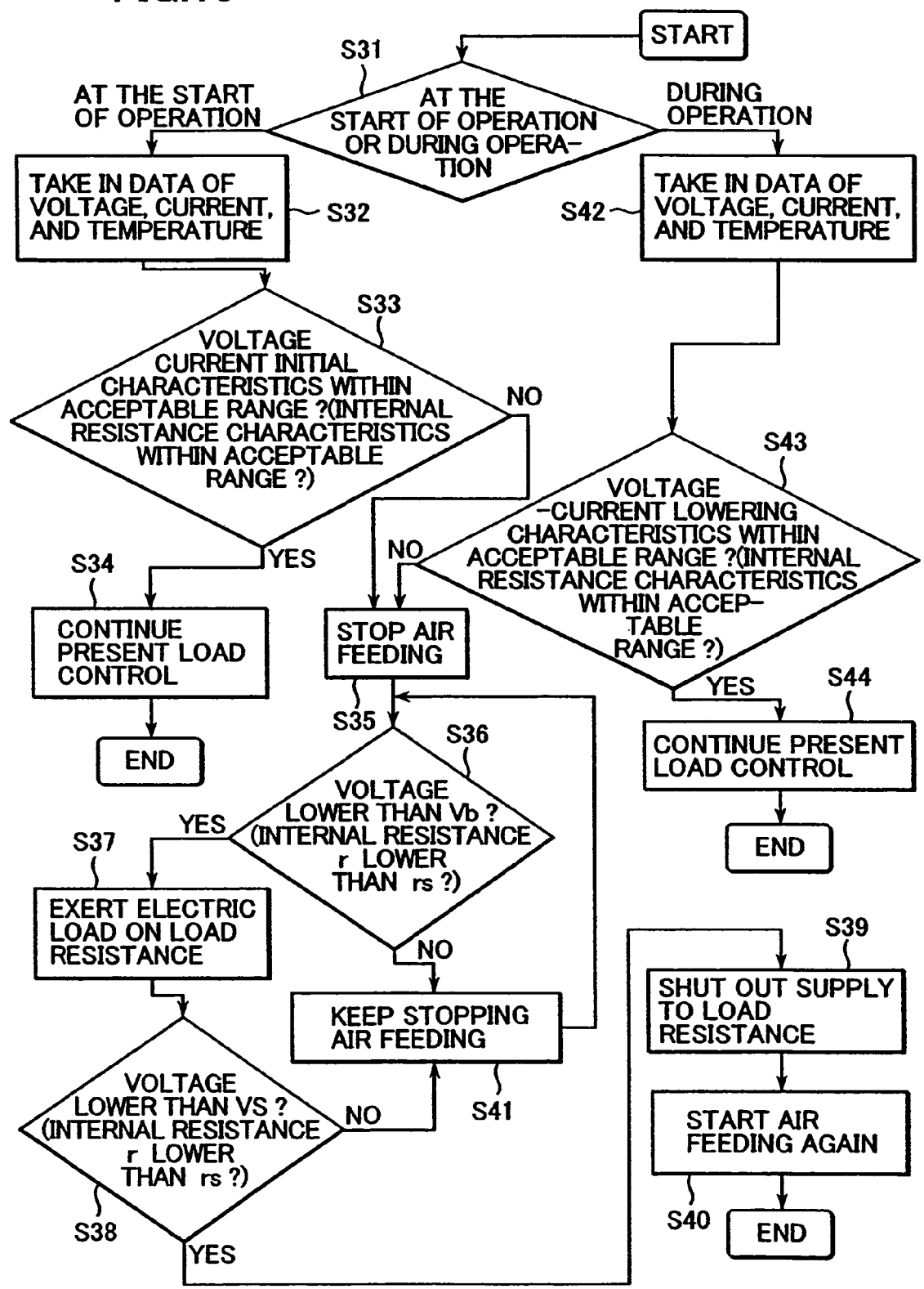
FIG. 15 is a flowchart for explaining the operation of the fuel cell apparatus of FIG. 13.

FIG. 14 is one example of a time chart for explaining the operation of the fuel cell apparatus of FIG. 13, and it is an example in which an output voltage when the load current of the fuel cell is constant is detected as a parameter of the dry state. A time t is taken as the abscissa, and a cell voltage Vcell when the load current is constant is taken as the ordinate. The cell voltage Vcell corresponds to the output voltage Vout of the fuel cell main body 171. In this fuel cell apparatus, when lowering of the output voltage of the fuel cell main body 171 becomes remarkable, the control unit 173 detects the lowering of the output voltage, and, when it is recognized that the output voltage is not higher than a certain value (Vth in FIG. 12, for example), the air feeding compressor 176 is controlled to be in an air feeding termination state according to signals from the control unit 173.

In order to recover the electricity generation performance, first, the air feeding from the air feeding compressor 176 is controlled. For example, when the fuel cell main body 171 is in a state such that the output voltage is decreased, the action of the air feeding compressor 176 may be controlled to be temporarily terminated to stop the air feeding. The temporary termination of the air feeding compressor 176 may prevent evaporation of moisture and permit the water formed to rapidly penetrate the electrolyte membrane, and thus the suppression of evaporation of moisture and penetration of water formed into the electrolyte membrane make it possible to quickly recover the electricity generation performance.

In addition, when the resistance lowering circuit portion is lowered in resistance, the fuel cell main body 171 is in a state such that a resistance between the output terminals is lowered or short-circuiting occurs between the output terminals, so that a large overcurrent flows the fuel cell main body 171. The overcurrent which flows the fuel cell main body 171 causes oxygen atoms to vigorously bond to hydrogen atoms on the oxygen-side electrode to form water in a large amount temporarily, and, when the output is lowered due to drying, the electrolyte membrane is rapidly in a wet state, making it possible to quickly recover the output.

When the air feeding to the fuel cell main body 171 is terminated, a potential difference between the output terminals, i.e., cell voltage Vcell rapidly becomes smaller. Therefore, as shown in FIG. 14, the voltage becomes lower than a predetermined voltage (voltage Vs in FIG. 12, for example) in a relatively short time, and the control unit 173 detects the fact that the output voltage is lower than a predetermined voltage, changing the control to general air feeding control. Then, the air feeding control portion becomes in a general state to feed air to the oxygen-side electrode. As a result, the cell voltage Vcell, i.e., output voltage Vout rapidly increases conversely. The output voltage Vout of the fuel cell main body 171 becomes higher again and exceeds the voltage Vb of the floating battery 180, so that electric power is supplied again to the load device 175 from the fuel cell main body 171. In this stage, when the air feeding to the fuel cell main body 171 is terminated, a large amount of water is formed and the electrolyte membrane rapidly becomes in a wet state, thus making it possible to quickly recover the output.

FIG. 14 also shows the case where operation of the fuel cell apparatus is started again, and, if the similar output voltage lowering occurs at the start of operation, the air feeding to the fuel cell main body 171 may be similarly stopped for recovery of the function and the output voltage may be increased similarly. In addition, when the air feeding in the fuel cell main body 111 is at a level such that the self-moistening state may be maintained, the output voltage keeps a predetermined value and electricity generation may be made for a long time while maintaining the output voltage at that value.

Next, one example of the flow of steps for operating the fuel cell apparatus according to the present embodiment shown in FIG. 13 will be described with reference to FIG. 15. When the output characteristics or internal resistance characteristics fall outside an acceptable range, the fuel cell apparatus of the present embodiment operates so as to recover them. In this example, the acceptable range immediately after starting the operation of the fuel cell apparatus, namely, at the start of operation and the acceptable range after the operation of the fuel cell apparatus continues for a while, namely, during the operation are different, and therefore the flowchart is constructed so that the processing goes through different flows of steps. These steps are shown in terms of a judgment of the control unit and, for example, steps for control made by the CPU of the control unit 173 in FIG. 13 correspond to the flowchart of FIG. 15.

As a step for control, first, a step S31 judges whether the current stage is immediately after starting the operation of the fuel cell apparatus, i.e., at the start of operation or after the operation of the fuel cell apparatus continues for a while, i.e., during the operation. This may be monitored using a clock or a timer in the control unit 173, and other data, for example, data from the load device side may be used.

When the judgment of the step S31 is "at the start of operation", the processing goes to a step S32 and the control unit 173 takes in data of a voltage, a current, and a temperature from the fuel cell main body 171. Then, the voltage-current characteristics or internal resistance characteristics of the fuel cell main body 171 upon taking in the data are detected or calculated by these parameters, and a step S33 judges whether or not the voltage-current initial characteristics or internal resistance characteristics fall within the acceptable range. When the voltage-current initial characteristics or internal resistance characteristics of the fuel cell main body 171 upon taking in the data fall within the acceptable range (YES), the processing goes to a step S34, and it is recognized that the present operating conditions are good and hence the present load control is continued, so that the processing is terminated.

When the voltage-current initial characteristics or internal resistance characteristics of the fuel cell main body 171 upon taking in the data are judged to fall outside the acceptable range (NO), the processing goes to a step S35, and the air feeding from the air feeding compressor 176 is terminated. The termination of the air feeding from the air feeding compressor 176 suppresses evaporation of moisture generated on the oxygen-side electrode of the fuel cell main body 111. Then, the processing goes to a step S36 to judge whether or not the output voltage Vout is lower than the voltage Vb. Here the voltage Vb is a nominal voltage Vb of the floating battery 180, and it may be set to be a little higher voltage or lower voltage, taking into consideration variation caused by control or fine adjustment. When the output voltage Vout is not lower than the voltage Vb (NO), termination of the air feeding from the air feeding compressor 176 is continued (step S41) and the processing goes back to the step S36 to judge again whether or not the output voltage Vout is lower than the voltage Vb.

The step S36 judges whether or not the output voltage Vout is lower than the voltage Vb, and, when the output voltage Vout is lower than the voltage Vb (YES), control of exerting an electric load on the load resistance is made (step S37), and a power element, such as the switching element 178, is controlled to be changed from off to on to permit a current to flow the resistance element 177 having a low resistance. Thus, a large amount of oxygen is consumed on the oxygen-side electrode of the fuel cell main body 171 to form moisture, and the water formed causes the electrolyte membrane to be in a wet state. Therefore, when the output is decreased due to drying, the electrolyte membrane is rapidly in a wet state, making it possible to quickly recover the output. Further, in this term, electric power cannot be supplied from the fuel cell main body 171, and the load device 175 may temporarily use electric power from the floating battery 180, and thus a problem of instantaneous interruption caused by the control of electric power may be effectively avoided.

After controlling a power element, such as the switching element 178, to be on in order to permit an overload current to flow the fuel cell main body 171, the processing goes to a step S38 to judge whether or not the output voltage Vout is lower than the voltage Vs (whether or not the internal resistance value r is lower than rs). When the output voltage Vout is not judged to be lower than the voltage Vs (the internal resistance value r is not judged to be lower than rs) (NO), the processing goes to a step S41, and termination of the air feeding from the air feeding compressor 176 is continued and the overload current which flows the fuel cell main body 171 is maintained as it is, so that the processing goes back to the step S36 to judge the conditions again.

When the output voltage Vout is judged to be lower than the voltage Vs (the internal resistance value r is judged to be lower than rs) (YES) in the step S38, it is recognized that recovery of the function has already been achieved by the water formed in the fuel cell main body 171, so that the overload current which flows the fuel cell main body 171 is shut out in a step S39. Therefore, a power element, such as the switching element 178, is controlled to be in an off-state from an on-state. Thus, the controlling of the switching element 178 to be in an off-state shuts out the current which flows the resistance element 177 and the overload current which flows the fuel cell main body 171 simultaneously. As a result, the load on the fuel cell main body 171 becomes a general load. Further, when the output voltage Vout is judged to be lower than the voltage Vs (the internal resistance value r is judged to be lower than rs) (YES), the air feeding from the air feeding compressor 176 is started again (step S40), so that the processing is terminated. FIG. 15 shows one example of the flow of steps using the air feeding control and the load current control in combination, but a flow of steps solely using the air feeding control is involved in the present example. That is, steps S36, S37, S39, S41 may be omitted in the flow of steps.

Next, when a predetermined period of time lapses from the start of operation, that is, the stage is during the operation, the step S31 judges "during the operation" and the processing goes to a step S42, and the control unit 173 takes in data of a voltage, a current, and a temperature from the fuel cell main body 171. Then, the voltage-current characteristics or internal resistance characteristics of the fuel cell main body 171 upon taking in the data are detected or calculated by these parameters, and a step S43 judges whether or not the voltage-current lowering characteristics or internal resistance characteristics during the operation fall within the acceptable range. When the voltage-current lowering characteristics or internal resistance characteristics of the fuel cell main body 171 upon taking in the data fall within the acceptable range (YES), the processing goes to a step S44, and it is recognized that the present operating conditions are good and hence the present load control is continued, so that the processing is terminated.

When the voltage-current lowering characteristics or internal resistance characteristics of the fuel cell main body 171 upon taking in the data are judged to fall outside the acceptable range (NO), the processing goes to the step S35 and the air feeding from the air feeding compressor 176 is terminated. Thus, the termination of the air feeding from the air feeding compressor 176 suppresses evaporation of moisture generated on the oxygen-side electrode of the fuel cell main body 111. Then, in order to permit an overload current to flow the fuel cell main body 171, the processing goes to the step S36 to judge whether or not the output voltage Vout is lower than the voltage Vb. Here the voltage Vb is a nominal voltage Vb of the floating battery 180, and it may be set to be a little higher voltage or lower voltage, taking into consideration variation caused by control or fine adjustment. When the output voltage Vout is not lower than the voltage Vb (NO), termination of the air feeding from the air feeding compressor 176 is continued (step S41) and the processing goes back to the step S36 to judge again whether or not the output voltage Vout is lower than the voltage Vb.

The step S36 judges whether or not the output voltage Vout is lower than the voltage Vb, and, when the output voltage Vout is lower than the voltage Vb (YES), control of exerting an electric load on the load resistance is made (step S37), and a power element, such as the switching element 178, is controlled to be changed from off to on to permit a current to flow the resistance element 177 having a low resistance. Thus, a large amount of oxygen is consumed on the oxygen-side electrode of the fuel cell main body 171 to form moisture, and the water formed causes the electrolyte membrane to be in a wet state. Therefore, when the output is decreased due to drying, the electrolyte membrane is rapidly in a wet state, making it possible to quickly recover the output. Further, in this term, electric power cannot be supplied from the fuel cell main body 171, and the load device 175 can temporarily use electric power from the floating battery 180, and thus a problem of instantaneous interruption caused by the control of electric power may be effectively avoided.

After controlling a power element, such as the switching element 178, to be on in order to permit an overload current to flow the fuel cell main body 171, the processing goes to the step S38 to judge whether or not the output voltage Vout is lower than the voltage Vs (whether or not the internal resistance value r is lower than rs). When the output voltage Vout is not judged to be lower than the voltage Vs (the internal resistance value r is not judged to be lower than rs) (NO), the processing goes to a step S41, and termination of the air feeding from the air feeding compressor 176 is continued and the overload current which flows the fuel cell main body 171 is maintained as it is, so that the processing goes back to the step S36 to judge the conditions again.

Like at the start of operation, during the operation, when the output voltage Vout is judged to be lower than the voltage Vs (the internal resistance value r is judged to be lower than rs) (YES) in the step S38, it is recognized that recovery of the function has already been achieved by the water formed in the fuel cell main body 171, so that the overload current which flows the fuel cell main body 171 is shut out in the step S39. Therefore, a power element, such as the switching element 178, is controlled to be in an off-state from an on-state. Thus, the controlling of the switching element 178 to be in an off-state shuts out the current which flows the resistance element 177 and the overload current which flows the fuel cell main body 171 simultaneously. As a result, the load on the fuel cell main body 171 becomes a general load. Further, when the output voltage Vout is judged to be lower than the voltage Vs (the internal resistance value r is judged to be lower than rs) (YES), the air feeding from the air feeding compressor 176 is started again (step S40), so that the processing is terminated.

According to the flow of steps described above, the fuel cell apparatus of the present embodiment judges whether or not the voltage-current characteristics or internal resistance characteristics, which are the output characteristics from the fuel cell main body, fall within an acceptable range, and, when the characteristics fall outside the acceptable range, the air feeding from the air feeding compressor 176 is stopped and further the switching element is controlled to be in an on-state to permit an overload current to flow the fuel cell main body. After permitting an overload current to flow, the output voltage or internal resistance value is similarly checked, and, when the value is lower than a certain level, the switching element is controlled to be in an off-state to stop the overload current into the fuel cell main body.

Therefore, the output characteristics of the fuel cell main body may be recovered in a relatively short time, and its control is conducted while monitoring the output characteristics and hence no unnecessary operation for recovery is made. Particularly, the voltage-current characteristics or internal resistance characteristics, which are the output characteristics from the fuel cell main body, and which fall within or outside an acceptable range, are controlled in different ways at the start of operation and during the operation and thus, even when the state of the electrolyte membrane is slightly changed, controls suitable for respective cases may be conducted.

In the present embodiment, an explanation is made on the case where the air feeding from the air feeding compressor 176 is stopped during recovery of the output, but the control may be made not to stop the air feeding but to lower the air feed rate for recovery of the output and then increase the air feed rate to the original rate after the recovery. In addition, in the flow of steps in FIG. 15, the air feeding from the air feeding compressor 176 is controlled and then the amount of the current which flows the fuel cell main body is adjusted, but the amount of the current which flows the fuel cell main body is adjusted and then the air feeding from the air feeding compressor 176 may be controlled, or only the air feeding from the air feeding compressor 176 may be controlled.

Next, a fuel cell apparatus according to another embodiment will be described with reference to FIG. 16. The apparatus of FIG. 16 has a fuel cell main body 211 having a structure formed by stacking on one another a plurality of electricity generators, e.g., MEAs, and further has a control unit 213 for controlling air feeding and a load and, as a load control portion, connected to the fuel cell main body 211, for permitting the value of a load on the fuel cell main body 211 to vary, a resistance lowering circuit portion including a switching element 218 and a resistance element 217, and a power supply compensating circuit portion including a diode 219 and a floating battery 220.

To the fuel cell main body 211 is connected through the load control portion a load device 215 to which the electromotive force generated in the fuel cell main body 211 is fed, and further, to the fuel cell main body 211 is connected a hydrogen feeding device 212 for feeding fuel fluid via a fuel feeding pipe 223. In addition, to the fuel cell main body 211 is connected an air feeding compressor 216 for feeding oxygen and evaporating excess moisture. Air from the air feeding compressor 216 is fed to the fuel cell main body 211 via an air feeding pipe 224, and exhausted via an air exhaust pipe 222, together with excess moisture and the like.

The air exhaust pipe 222 is a fluid passage which passes through the oxygen-side electrode of the fuel cell main body 211 to evaporate excess moisture generated on the oxygen-side electrode and exhaust it. The air exhaust pipe 222 is, particularly in the present embodiment, provided with a shut-off valve 221 which may shut out the air flow through the air exhaust pipe 222. The shut-off valve 221 is in a shut-out state or in a flow state according to signals from the control unit 213, and, for example, when the output characteristics of the fuel cell main body 211 are lowered, the shut-off valve 221 is in a shut-out state to shut out the air flow. By letting the shut-off valve 221 be in a shut-out state, removal of moisture on the oxygen-side electrode of the fuel cell main body 211 is suppressed, so that the water formed rapidly causes the electrolyte membrane to be in a wet state. Therefore, when the output is decreased due to drying, it is possible to quickly recover the output. In the apparatus of FIG. 16, the fuel cell main body 211, the hydrogen feeding device 212, the load device 215, and the air feeding compressor 216 have, respectively, the same constructions as those of the corresponding devices shown in FIG. 13, and overlapping description is omitted for simplifying the descriptions.

Figure 16:
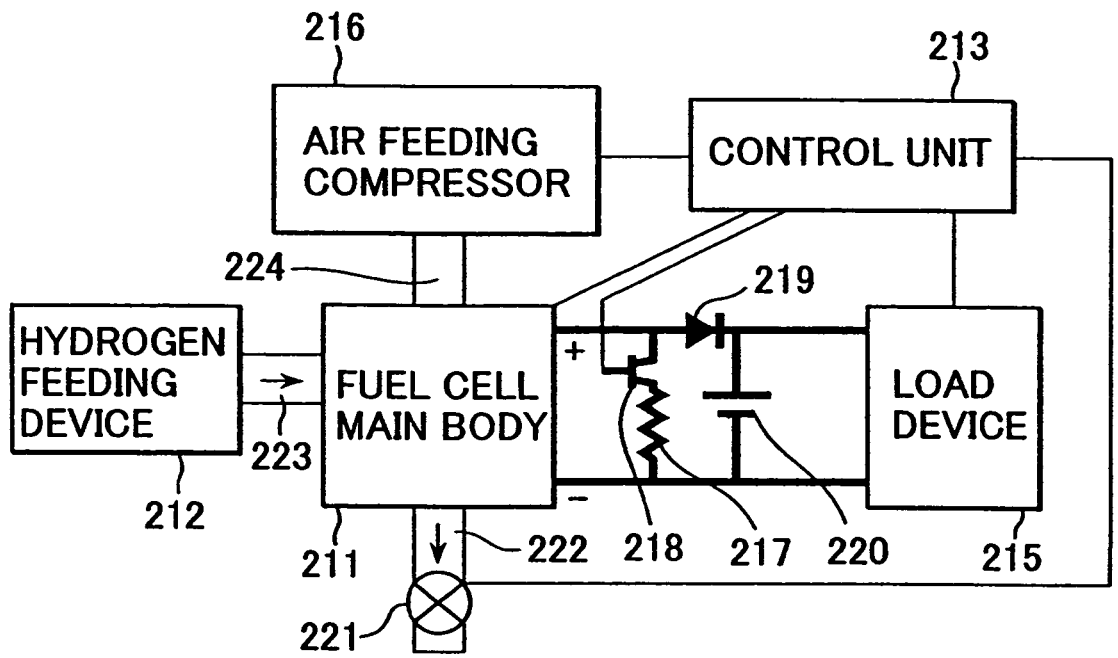
FIG. 16 is a block diagram showing a fuel cell apparatus according to an embodiment of the present invention.

In the apparatus of FIG. 16, the air feeding from the air feeding compressor 216 may be controlled by the control unit 213, and in addition, the air flow onto the oxygen-side electrode surface may be controlled by the shut-off valve 221 formed in the air exhaust pipe 222, and hence, in an apparatus in which stopping of the air feeding compressor 216 does not go well, the shut-off valve 221 may surely control air feeding.

In the fuel cell apparatus of the present embodiment, when the output is decreased due to drying, the electrolyte membrane is rapidly in a wet state, making it possible to quickly recover the output. Further, in this term, electric power cannot be supplied from the fuel cell main body 211, but the load device 215 may temporarily use electric power from the floating battery 220, and thus a problem of instantaneous interruption caused by the control of electric power may be effectively avoided.

Next, a fuel cell apparatus according to another embodiment will be described with reference to FIG. 17. The apparatus of FIG. 17 has a fuel cell main body 231 having a structure formed by stacking on one another a plurality of electricity generators, e.g., MEAs, and further has a control unit 233 for controlling air feeding and a load and, as a load control portion, connected to the fuel cell main body 231, for permitting the value of a load on the fuel cell main body 231 to vary, a resistance lowering circuit portion including a switching element 238 and a resistance element 237, and a power supply compensating circuit portion including a diode 239 and a floating battery 240.

To the fuel cell main body 231 is connected through the load control portion a load device 235 to which the electromotive force generated in the fuel cell main body 231 is fed, and further, to the fuel cell main body 231 is connected a hydrogen feeding device 232 for feeding fuel fluid via a fuel feeding pipe. In addition, to the fuel cell main body 231 is connected an air feeding compressor 236 for feeding oxygen and evaporating excess moisture. Air from the air feeding compressor 236 is fed to the fuel cell main body 231 via an air feeding pipe 242, and exhausted via an air exhaust pipe 241, together with excess moisture and the like.

The air feeding pipe 242 is a fluid passage for feeding air to the oxygen-side electrode of the fuel cell main body 231. The air feeding pipe 242 is, particularly in the present embodiment, provided with a shut-off valve 243 which may shut out the air flow through the air exhaust pipe 222. The shut-off valve 243 is in a shut-out state or in a flow state according to signals from the control unit 233, and, for example, when the output characteristics of the fuel cell main body 231 are lowered, the shut-off valve 243 is in a shut-out state to shut out the air flow. By letting the shut-off valve 243 be in a shut-out state, removal of moisture on the oxygen-side electrode of the fuel cell main body 231 is suppressed, so that the water formed rapidly causes the electrolyte membrane to be in a wet state. Therefore, when the output is decreased due to drying, it is possible to quickly recover the output. In the apparatus of FIG. 17, the fuel cell main body 231, the hydrogen feeding device 232, the load device 235, and the air feeding compressor 236 have, respectively, the same constructions as those of the corresponding devices shown in FIG. 13, and overlapping description is omitted for simplifying the descriptions.

Figure 17:
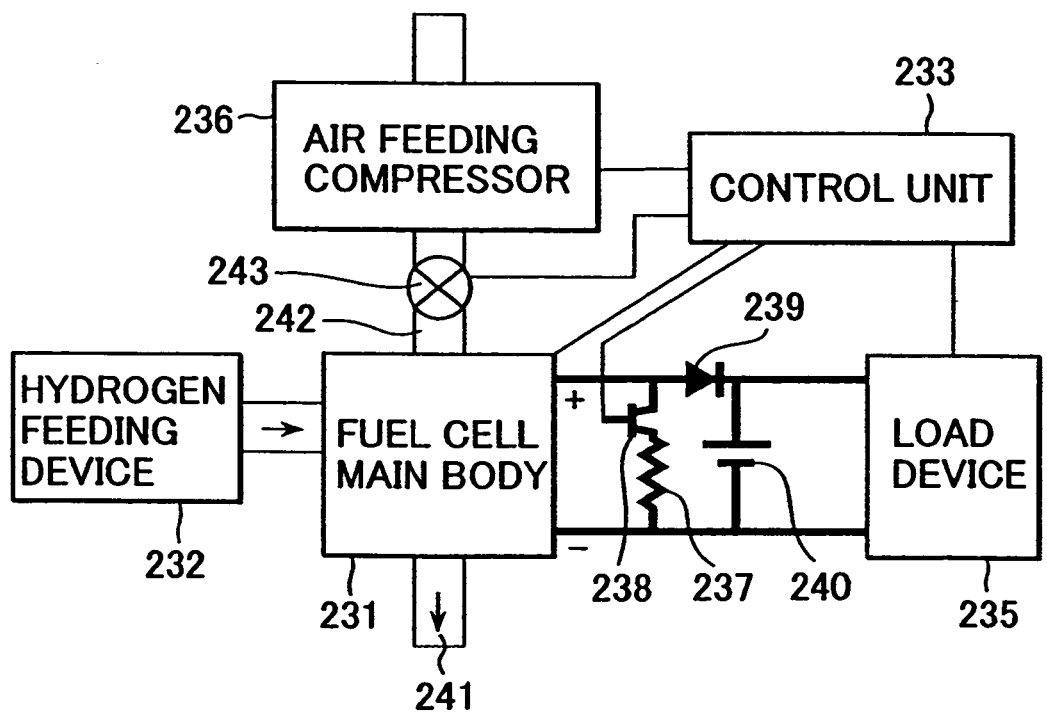
FIG. 17 is a block diagram showing a fuel cell apparatus according to an embodiment of the present invention.

In the apparatus of FIG. 17, the air feeding from the air feeding compressor 236 may be controlled by the control unit 233, and in addition, the air flow onto the oxygen-side electrode surface may be controlled by the shut-off valve 243 formed in the air feeding pipe 242, and hence, in an apparatus in which stopping of the air feeding compressor 236 does not go well, the shut-off valve 243 may surely control air feeding.

In the fuel cell apparatus of the present embodiment, when the output is decreased due to drying, the electrolyte membrane is rapidly in a wet state, making it possible to quickly recover the output. Further, in this term, electric power cannot be supplied from the fuel cell main body 231, but the load device 235 may temporarily use electric power from the floating battery 240, and thus a problem of instantaneous interruption caused by the control of electric power may be effectively avoided.

Next, a fuel cell apparatus according to another embodiment will be described with reference to FIG. 18. The apparatus of FIG. 18 has a fuel cell main body 251 having a structure formed by stacking on one another a plurality of electricity generators, e.g., MEAs, and further has a control unit 253 for controlling air feeding and a load and, as a load control portion, connected to the fuel cell main body 251, for permitting the value of a load on the fuel cell main body 251 to vary, a resistance lowering circuit portion including a switching element 258 and a resistance element 257, and a power supply compensating circuit portion including a diode 259 and a floating battery 260.

To the fuel cell main body 251 is connected through the load control portion a load device 255 to which the electromotive force generated in the fuel cell main body 251 is fed, and further, to the fuel cell main body 251 is connected a hydrogen feeding device 252 for feeding fuel fluid via a fuel feeding pipe. In addition, as shown above in FIG. 3 and FIG. 5, the fuel cell main body 251 is constructed so that it is contained in a housing, and draws air from the outside of the housing through an opening portion 262 to achieve electricity generation.

In the present embodiment, a shutter 264 is provided near the opening portion 262, and the shutter 264 opens or closes according to signals from the control unit 253 and is controlled to feed or not to feed air to the oxygen-side electrode of the fuel cell main body 251. For example, when the shutter 264 closes, the air flow to the air feeding pipe 263 adjacent to the shutter 264 is stopped, and hence removal of moisture on the oxygen-side electrode of the fuel cell main body 251 is suppressed, so that the water formed rapidly causes the electrolyte membrane to be in a wet state. Therefore, when the output is decreased due to drying, it is possible to quickly recover the output. In the apparatus of FIG. 18, the fuel cell main body 251, the hydrogen feeding device 252, and the load device 255 have, respectively, the same constructions as those of the corresponding devices shown in FIG. 13, and overlapping description is omitted for simplifying the descriptions.

Figure 18:
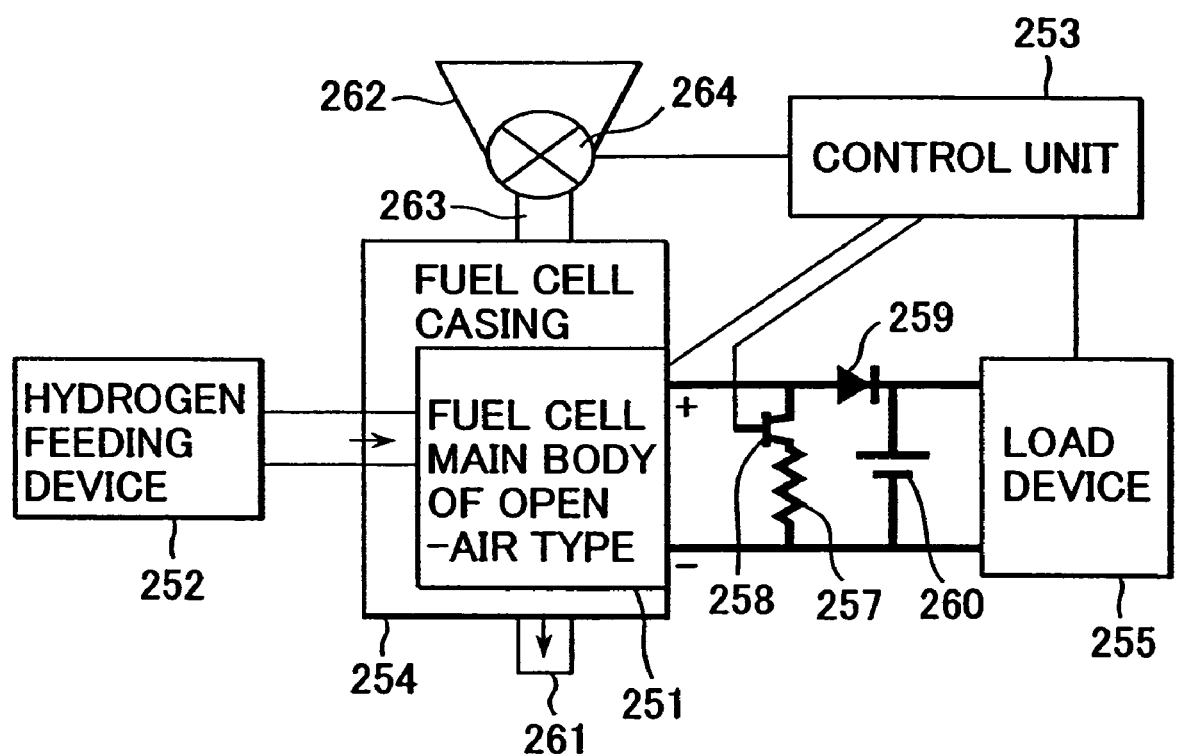
FIG. 18 is a block diagram showing a fuel cell apparatus according to an embodiment of the present invention.

In the apparatus of FIG. 18, the air feeding from the air feeding compressor 236 may be controlled by the control unit 253, and in addition, the air flow onto the oxygen-side electrode surface may be controlled by the shutter 264 provided near the opening portion 262, and hence, in an apparatus in which stopping of the air feeding compressor 236 does not go well, the shutter 264 may surely control air feeding.

In the fuel cell apparatus of the present embodiment, when the output is decreased due to drying, the electrolyte membrane is rapidly in a wet state, making it possible to quickly recover the output. Further, in this term, electric power cannot be supplied from the fuel cell main body 251, but the load device 255 can temporarily use electric power from the floating battery 260, and thus a problem of instantaneous interruption caused by the control of electric power may be effectively avoided.

In the above embodiment, the apparatus has a construction such that short-circuiting is caused between a pair of output terminals by an electric circuit or the resistance between the output terminals is lowered in order to allow an overcurrent to flow the fuel cell main body, but the method is not limited to the one operating the resistance value between the output terminals, and a means for causing short-circuiting or lowering of the resistance between the fuel-side electrode and the oxygen-side electrode may be formed in the MEA itself or current collector or the like, and either a single or a plurality of means for causing short-circuiting or lowering of the resistance may be formed. Further, for achieving uniform function recovery treatment in the electrolyte membrane, wiring for letting an overcurrent flow the fuel cell main body may be provided.

In addition, in the present embodiment, an explanation is made on an example in which a predetermined operation for recovery of the output characteristics is conducted while monitoring the output voltage of the fuel cell main body, but the operation is not limited to this, and a predetermined operation for recovery of the output characteristics may be made automatically using a timer or the like, and especially at the start of operation, excellent results may be obtained using a timer. When the fuel cell main body consists of a plurality of electricity generators, all the electricity generators may be subjected to overcurrent treatment at the same time, but the electricity generators may be successively subjected to treatment so that an overcurrent is applied to the individual electricity generators with a time lag.

In the present invention, an explanation is made on a laptop PC as an apparatus onto which the fuel cell or fuel cell card is mounted, and, as other examples of use, the present invention may be used in applications, such as printer and facsimile, peripheral apparatuses for personal computer, telephone, television set, image display apparatuses, communication apparatuses, portable terminal, camera, audiovisual apparatuses, electric fan, radio set, clock, refrigerator, hair dryer, iron, tea kettle, cleaner, rice cooker, electromagnetic cooker, lighting apparatuses, tools, such as game machines and radio-controlled cars, electric tools, medical apparatuses, measurement apparatuses, apparatuses for automobile, office machines, apparatuses for health and beauty, electronically controlled robot, clothes-form electronic appliances, a variety of electric appliances, transport machines, such as vehicle, ship, and aircraft, household or business electricity generation apparatus, and the like. Particularly, the present invention may have a relatively simple mechanism, and therefore is preferably used as a fuel cell for small-size portable apparatus. Examples of small-size portable apparatuses include laptop computer; PDA; portable phone; portable audio apparatuses, such as CD and MD; and portable visual apparatuses, such as portable DVD, digital camera, portable video camera and the like.

In the present invention, an explanation is made on examples mainly using hydrogen gas as a fuel, but a construction using an alcohol, such as methanol (liquid), as a fuel may be employed in accordance with a so-called direct methanol system.

In the fuel cell apparatus and the method for controlling a fuel cell of the present invention, when a load on the fuel cell is changed depending on the state of the output or state of the internal resistance of the fuel cell to control the output voltage to be lowered, the output current increases to promote the reaction on the oxygen-side electrode, thus forming water in an increased amount. The water formed may suppress drying of the oxygen electrode as well as let the oxygen electrolyte be in an appropriate wet state, thus making it possible to quickly recover the output characteristics.

In addition, in the fuel cell apparatus and the method for controlling a fuel cell of the present invention in an embodiment, the air feed rate is changed by the air feeding control portion depending on the state of the output or internal resistance of the fuel cell and controlled to suppress evaporation of moisture on the fuel cell surface, and thus, not only is drying of the oxygen-side electrode suppressed, but also the oxygen-side electrode may be in an appropriate wet state. Therefore, by the fuel cell apparatus and the method for controlling a fuel cell of the present invention, the output characteristics may be recovered in a relatively short time.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for controlling a fuel cell, comprising:
    measuring an output voltage of the fuel cell including an electrolyte;
    increasing a load current on the fuel cell from a first load current to a second load current to recover from a dry state associated with the electrolyte at the output voltage equaling or less than a first threshold value based on the dry state, wherein the second load current is greater than the first load current; and
    decreasing the load current from the second load current to the first load current at the output voltage equaling or less than a second threshold value based on a wet state associated with the electrolyte, thereby supplying electric power with a device from the fuel cell.

2. The method for controlling a fuel cell according to claim 1, wherein the first threshold value ranges from 0.01 V to 0.8 V.

3. The method for controlling a fuel cell according to claim 1, further comprising supplying the device with electric power from a primary battery, a secondary battery, a capacitor, or another fuel cell during increasing the load current from the first load current to the second load current.

4. The method for controlling a fuel cell according to claim 1, wherein the first threshold value is based on an initial dry state of the electrolyte.

5. The method for controlling a fuel cell according to claim 1, wherein the second threshold value is equal to the first threshold value.

* * * * *